(12) United States Patent
Kowalski et al.

(10) Patent No.: US 11,528,058 B2
(45) Date of Patent: Dec. 13, 2022

(54) INDUCTIVE CHARGING COIL CONFIGURATION FOR WEARABLE ELECTRONIC DEVICES

(71) Applicant: Apple Inc., Cupertino, CA (US)

(72) Inventors: Stefan A. Kowalski, La Honda, CA (US); Christopher S. Graham, San Francisco, CA (US); Eric S. Jol, San Jose, CA (US)

(73) Assignee: Apple Inc., Cupertino, CA (US)

( * ) Notice: Subject to any disclaimer, the term of this patent is extended or adjusted under 35 U.S.C. 154(b) by 245 days.

(21) Appl. No.: 15/697,147

(22) Filed: Sep. 6, 2017

(65) Prior Publication Data
US 2018/0069600 A1    Mar. 8, 2018

Related U.S. Application Data

(60) Provisional application No. 62/384,098, filed on Sep. 6, 2016, provisional application No. 62/384,100, filed on Sep. 6, 2016.

(51) Int. Cl.
*H04B 5/00* (2006.01)
*H01F 27/38* (2006.01)
(Continued)

(52) U.S. Cl.
CPC ....... *H04B 5/0037* (2013.01); *H01F 27/2823* (2013.01); *H01F 27/36* (2013.01);
(Continued)

(58) Field of Classification Search
CPC ..... H04B 5/0037; H04B 5/0087; H02J 50/40; H02J 50/10; H02J 7/025; H02J 50/402;
(Continued)

(56) References Cited

U.S. PATENT DOCUMENTS

| 3,646,562 A | 2/1972 | Acker et al. |
| 3,938,018 A | 2/1976 | Dahl |

(Continued)

FOREIGN PATENT DOCUMENTS

| CN | 202190128 U | 4/2012 |
| CN | 102946154 A | 2/2013 |

(Continued)

OTHER PUBLICATIONS

International Patent Application No. PCT/US2017/050263, "International Search Report and Written Opinion", dated Dec. 22, 2017, 16 pages.

(Continued)

*Primary Examiner* — M Baye Diao
(74) *Attorney, Agent, or Firm* — Kilpatrick Townsend & Stockton LLP

(57) ABSTRACT

This disclosure relates to the inductive charging of portable electronic devices. In particular, a charging assembly is disclosed that allows a portable electronic device to be charged in multiple orientations with respect to a charging device. The charging assembly includes two or more separate inductive receiving coils. The inductive receiving coils can be arranged orthogonally with respect to one another by wrapping one or more secondary receiving coils around an antenna. By orienting the receiving coils orthogonally with respect to one another, the likelihood of at least one of the receiving coils being aligned with a charging field emitted by a charging device increases substantially.

20 Claims, 22 Drawing Sheets

(51) Int. Cl.
*H01F 27/28* (2006.01)
*H01F 38/14* (2006.01)
*H01F 27/36* (2006.01)
*H02J 50/40* (2016.01)
*H02J 50/70* (2016.01)
*H02J 50/10* (2016.01)

(52) U.S. Cl.
CPC ........... *H01F 27/366* (2020.08); *H01F 27/38* (2013.01); *H01F 38/14* (2013.01); *H02J 50/10* (2016.02); *H02J 50/402* (2020.01); *H02J 50/70* (2016.02); *H04B 5/0087* (2013.01)

(58) Field of Classification Search
CPC .......... H02J 50/70; H01F 38/14; H01F 27/38; H01F 27/365; H01F 27/2823; H01F 27/36; H01F 27/366
USPC ........................................................ 320/108
See application file for complete search history.

(56) References Cited

U.S. PATENT DOCUMENTS

| | | | |
|---|---|---|---|
| 5,479,486 | A | 12/1995 | Saji |
| 5,600,225 | A | 2/1997 | Goto |
| 5,909,099 | A | 6/1999 | Watanabe et al. |
| 5,982,764 | A | 11/1999 | Palermo et al. |
| 6,028,413 | A | 2/2000 | Brockmann |
| 6,300,920 | B1 | 10/2001 | Pertl et al. |
| 6,501,439 | B2 * | 12/2002 | Keilen ................ H01Q 1/38 343/895 |
| 7,026,789 | B2 | 4/2006 | Bozzone et al. |
| 7,211,986 | B1 | 5/2007 | Flowerdew et al. |
| 7,443,163 | B2 * | 10/2008 | Warntjes ........... G01R 33/3657 324/318 |
| 7,443,362 | B2 * | 10/2008 | Yungers ............. G06K 7/10316 343/702 |
| 7,593,538 | B2 * | 9/2009 | Polinske ................ H01Q 7/00 381/322 |
| 8,929,986 | B2 | 1/2015 | Parker ................ A61N 1/36071 607/36 |
| 2002/0047767 | A1 | 4/2002 | Hegde et al. |
| 2003/0011527 | A1 | 1/2003 | Kokorin et al. |
| 2004/0145342 | A1 | 7/2004 | Lyon |
| 2008/0238600 | A1 * | 10/2008 | Olson ................ H01F 17/0006 336/180 |
| 2010/0053014 | A1 * | 3/2010 | Yosui .................... H01Q 1/20 343/787 |
| 2010/0289341 | A1 | 11/2010 | Ozaki et al. |
| 2011/0115607 | A1 | 5/2011 | Deguchi et al. |
| 2012/0098486 | A1 | 4/2012 | Jung |
| 2012/0249396 | A1 | 10/2012 | Parsche |
| 2012/0313742 | A1 | 12/2012 | Kurs et al. |
| 2013/0099587 | A1 | 4/2013 | Lou et al. |
| 2013/0116763 | A1 * | 5/2013 | Parker .................. A61N 1/3787 607/117 |
| 2013/0176179 | A1 * | 7/2013 | Park ..................... H02J 50/70 343/702 |
| 2014/0143933 | A1 | 5/2014 | Low et al. |
| 2014/0191912 | A1 * | 7/2014 | Darden, IV ........... H01Q 1/273 343/718 |
| 2014/0239729 | A1 | 8/2014 | Covic |
| 2014/0306656 | A1 * | 10/2014 | Tabata ................. H02J 50/90 320/108 |
| 2014/0354223 | A1 | 12/2014 | Lee et al. |
| 2014/0375262 | A1 * | 12/2014 | Yamaguchi ........... H01F 38/14 320/108 |
| 2015/0015180 | A1 | 1/2015 | Weinstein et al. |
| 2015/0054455 | A1 * | 2/2015 | Kim .................... H02J 7/0042 320/108 |
| 2015/0222017 | A1 * | 8/2015 | Kumura ................. H01Q 5/40 343/788 |
| 2015/0280322 | A1 * | 10/2015 | Saito .................... H02J 50/10 343/788 |
| 2015/0333389 | A1 | 11/2015 | Orihara et al. |
| 2015/0371768 | A1 | 12/2015 | Graham et al. |
| 2016/0064137 | A1 | 3/2016 | Perez et al. |
| 2016/0094051 | A1 | 3/2016 | Soar |
| 2016/0099577 | A1 | 4/2016 | Park et al. |
| 2016/0109852 | A1 | 4/2016 | Kuwabara et al. |
| 2016/0164335 | A1 | 6/2016 | Kanahara et al. |
| 2016/0172890 | A1 * | 6/2016 | Jeong ...................... H02J 7/04 320/108 |
| 2016/0322852 | A1 | 11/2016 | Yeh et al. |
| 2017/0040845 | A1 * | 2/2017 | Yuasa .................... H01F 3/10 |
| 2017/0062949 | A1 * | 3/2017 | Kerselaers ........... H04B 5/0031 |
| 2017/0263376 | A1 * | 9/2017 | Verschueren ........... H01F 38/14 |
| 2018/0015832 | A1 | 1/2018 | Nguyen et al. |
| 2018/0033548 | A1 | 2/2018 | Yang et al. |
| 2018/0198190 | A1 * | 7/2018 | Leem ....................... H01Q 1/24 |
| 2018/0241116 | A1 * | 8/2018 | Kerselaers ............. H01Q 1/273 |
| 2018/0287243 | A1 * | 10/2018 | Ko ........................... H01Q 1/38 |
| 2018/0287433 | A1 * | 10/2018 | Bae ......................... H01Q 7/06 |

FOREIGN PATENT DOCUMENTS

| | | | | |
|---|---|---|---|---|
| CN | 103733460 | A | 4/2014 | |
| EP | 2015424 | A2 * | 1/2009 | ........ H01F 27/2871 |
| KR | 20140011756 | | * 1/2014 | |
| WO | 0059069 | | 10/2000 | |
| WO | 0180360 | | 10/2001 | |
| WO | 2001080360 | A1 | 10/2001 | |
| WO | 2009026253 | | 2/2009 | |
| WO | 2015199044 | | 12/2015 | |

OTHER PUBLICATIONS

U.S. Appl. No. 15/697,151, "Final Office Action", dated Mar. 14, 2019, 11 pages.
U.S. Appl. No. 15/697,151, "Non-Final Office Action", dated Dec. 13, 2018, 10 pages.
U.S. Appl. No. 15/697,151, Non-Final Office Action, dated Jun. 27, 2019, 13 pages.
U.S. Appl. No. 15/697,141, Notice of Allowance, dated Dec. 27, 2019, 9 pages.
"Notification of the First Office Action," dated May 21, 2020 in Chinese Patent Application No. 201780020808.8. 20 pages, includes English translation.
"Notification of Third Office Action," dated Nov. 3, 2021 in Chinese Patent Application No. 201780020808.8. 20 pages (includes English translation).
"Notification of Second Office Action," dated Apr. 29, 2021 in Chinese Patent Application No. 201780020808.8. 10 pages (includes English translation).

* cited by examiner

C-C

D-D

E-E

F-F

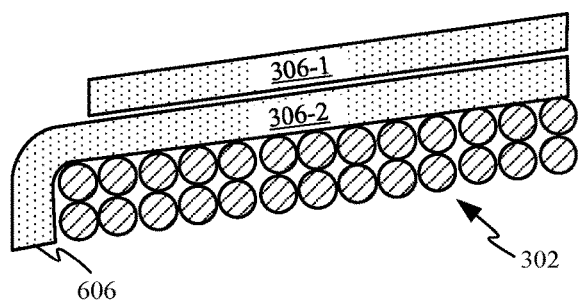
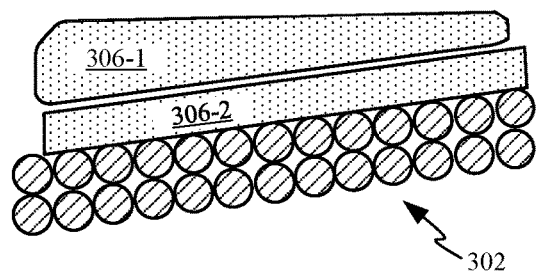
FIG. 6D
FIG. 6E
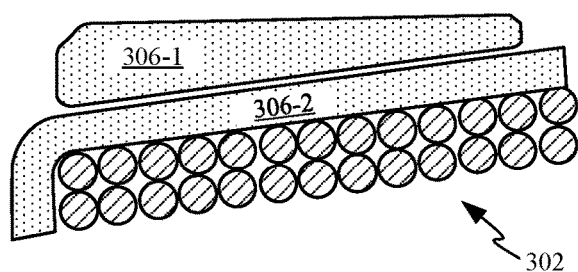
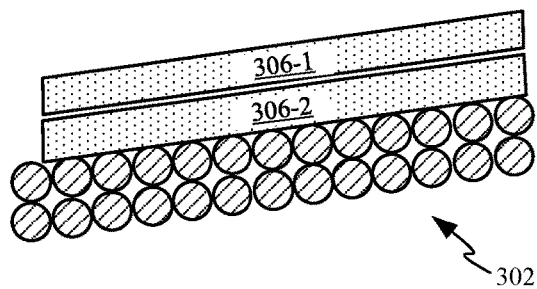
FIG. 6F
FIG. 6G

INDUCTIVE CHARGING COIL CONFIGURATION FOR WEARABLE ELECTRONIC DEVICES

CROSS-REFERENCES TO RELATED APPLICATIONS

This application claims priority to U.S. Provisional Patent Application Nos. 62/384,100 and 62/384,098, filed on Sep. 6, 2016, entitled "Orthogonally Charged Devices", the disclosures of which are hereby incorporated by reference in its entirety for all purposes.

FIELD

This application generally relates to systems and methods for wirelessly charging electronic devices. In particular, wireless charging assemblies capable of being charged by a magnetic field in different orientations are described.

BACKGROUND

Conventional wireless charging applications generally rely upon precise alignment of transmission and receiving coils to achieve efficient wireless charging. In particular, the efficiency of inductive charging drops rapidly with any misalignment of the transmission and receiving coils. This limits the number of ways in which a charger for an electronic device can be designed. The extra time necessary to ensure the coils are aligned for charging can remove some of the convenience that ought to be associated with wireless charging.

SUMMARY

This disclosure describes various embodiments that relate to the integration of multiple inductive charging coils into an electronic device, which allow the electronic device to be charged in multiple orientations. In some embodiments, the inductive charging coils can be wrapped around one another so that an amount of space taken up by the inductive charging coils is reduced. In devices having external features that limit the number of orientations the device naturally rests in, two or more different coils can be oriented so that charging performance is optimized in each of the limited number of orientations. In some embodiments, additional inductive charging coils can be positioned on separate ferritic cores and configured to receive electric energy from a charging pad.

A wearable device is disclosed and includes the following: a device housing; an antenna disposed within the device housing and configured to receive and transmit data from the wearable device; and an inductive charging coil including multiple loops wrapped around a portion of the antenna. In some embodiments, the inductive charging coil is printed upon a flexible substrate. In some embodiments, the antenna is arranged along a ferritic sheet.

An electronic device is disclosed and includes the following: an antenna; a flexible substrate wrapped around a portion of the antenna, opposing ends of the flexible substrate being joined together; electrically conductive traces arranged along a surface of the flexible substrate, the electrically conductive traces being connected together in the region where the opposing ends of the flexible substrate are joined together; and a device housing enclosing the antenna and the inductive charging coil.

A wearable device is disclosed and includes the following: a device housing; an antenna disposed within the device housing and configured to receive and transmit data from the wearable device; and a flexible substrate wrapped around a portion of the antenna, opposing ends of the flexible substrate being joined together to form a loop; electrically conductive traces arranged along a surface of the flexible substrate, the electrically conductive traces extending across the joined portion of the loop multiple times to form a coil structure configured to receive electrical energy from a magnetic field.

An electronic device is disclosed and includes the following: a primary inductive charging coil defining a first opening; and a secondary inductive charging coil wound around a portion of the primary inductive charging coil and defining a second opening through which the portion of the primary inductive charging coil extends, the secondary inductive charging coil extending through the first opening defined by the primary inductive charging coil; and a device housing enclosing the primary and secondary inductive charging coils.

An electronic device is disclosed and includes the following: a primary inductive charging coil; a secondary coil assembly wound around a width of the primary inductive charging coil; and a device housing enclosing the primary inductive charging coil and the secondary coil assembly.

A wearable device is disclosed and includes the following: a primary inductive charging coil; an AC shield stacked atop the primary inductive charging coil and defining a first opening; a secondary inductive charging coil defining a second opening and extending through the first opening, the secondary inductive coil wound around a portion of the AC shield that is disposed within the first opening; and a device housing enclosing the primary inductive charging coil and the secondary coil assembly.

A wearable device is disclosed and includes the following: a device housing; and an inductive charging coil assembly disposed within the device housing and including: a ferritic core having a joint region, a first leg extending away from the joint region in a first direction and a second leg extending away from the joint region in a second direction different from the first direction; a first inductive coil wrapped around a portion of the first leg; and a second inductive coil wrapped around a portion of the second leg.

A wearable device is disclosed and includes the following: a device housing; a wristband attached to opposing sides of the device housing; and an inductive charging coil assembly, comprising: a planar coil, a ferritic core disposed around a periphery of the planar coil, the ferritic core having a joint portion, a first leg extending away from the joint in a first direction and a second leg extending away from the joint portion in a second direction different than the first direction, a first inductive coil wrapped around the first leg, and a second inductive coil wrapped around the second leg.

A wearable device is disclosed and includes the following: a device housing; a wristband coupled to the device housing; and an inductive charging coil assembly positioned within the device housing, the inductive charging coil assembly including: first, second, third and fourth ferritic cores positioned in a polygonal arrangement, at least two of the ferritic cores being disposed on opposing sides of the device housing, and first, second third and fourth inductive coils wrapped around the first, second, third and fourth ferritic cores, respectively.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which:

FIGS. 6A-6G show cross-sectional views of various embodiments of an AC shield and primary inductive charging coil;

DETAILED DESCRIPTION

Figure 1A:
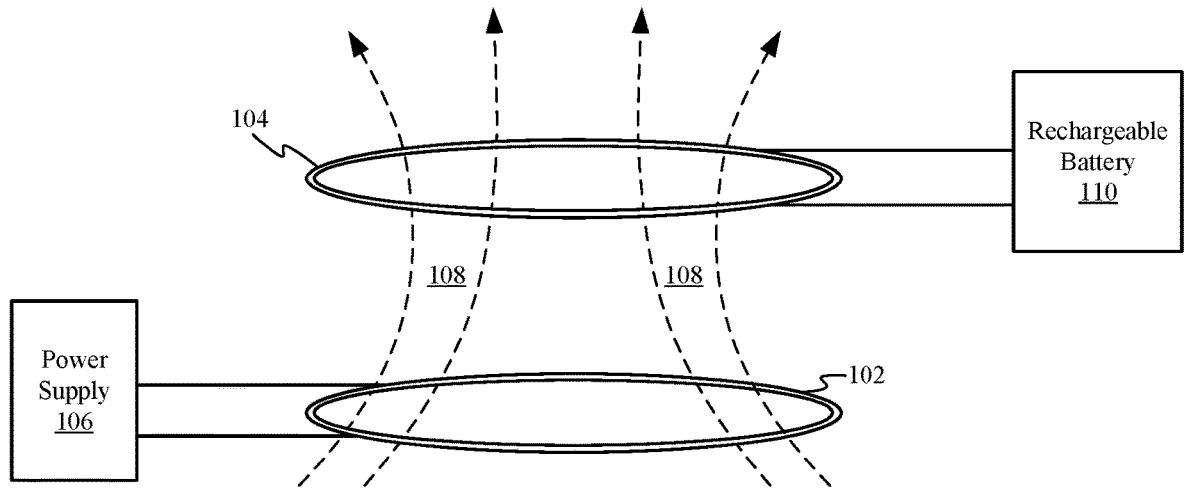
FIGS. 1A-1B show various orientations of inductive transmission and receiver coils.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Conventional inductive charging methods generally rely on precise alignment, similar coil size and close proximity to achieve an efficient wireless transfer of power. Small changes in alignment and/or proximity of an electronic device with respect to a wireless charger can have disruptive effects on the efficiency with which power is transferred to the electronic device. Predictably, these constraints limit the orientations that the electronic device can have with respect to the charger. For this reason, ensuring proper alignment and positioning of the wireless charger with respect to the electronic device can be important in many existing wireless charging systems.

Some embodiments of the present disclosure solve the aforementioned problem by providing a wireless charging system with multiple receiver coils oriented in two or more directions. Such a configuration can allow for an increased number of orientations in which the device can receive wireless power; however including multiple coils in a device can take up valuable internal space within an electronic device. In some embodiments, the additional receiver coils can be integrated into a single assembly to avoid the situation in which the additional receiver coils take up additional space within the electronic device. For example, the wireless charging system can include a primary receiver coil arranged in a first direction and a secondary coil assembly wrapped around a portion of the first receiver coil so that the second coil assembly is arranged in a second direction substantially orthogonal to the first direction. Because the secondary coil assembly is wrapped around the primary coil, the secondary coil assembly adds only a minimal amount of volume to the wireless charging system on account of the volume that would normally be taken up by the central volume of the secondary coil system being efficiently used by the primary receiver coil. In some embodiments, the wireless charging system can include an AC shield formed from ferritic materials. In some embodiments, the AC shield can include a split that can increase the wireless charging efficiency in some use cases. When the wireless charging system includes an AC shield, the second receiver coil can be wrapped around both the first receiver coil and the AC shield. In this way, both the first and second receiver coils can be in direct contact with the AC shield. Because the second receiver coil tends to be farther away from the wireless charging system than the first coil, performance of the second receiver coil is substantially improved by the presence of the AC shield, which functions to guide magnetic flux generated by the wireless charging system towards the second receiver coil.

In embodiments where a portion of the first receiver coil is surrounded by the second receiver coil, the wire used in forming the first receiver coil can be plated in iron or other magnetically attractable alloys to increase the efficiency with which electrical energy can be drawn into the second receiver coil. In some embodiments, the second receiver coil can take the form of electrically conductive traces printed on a flexible circuit and wrapped around at least a portion of the first receiver coil.

These and other embodiments are discussed below with reference to FIGS. 1A-13; however, those skilled in the art will readily appreciate that the detailed description given herein with respect to these figures is for explanatory purposes only and should not be construed as limiting.

Figure 1B:
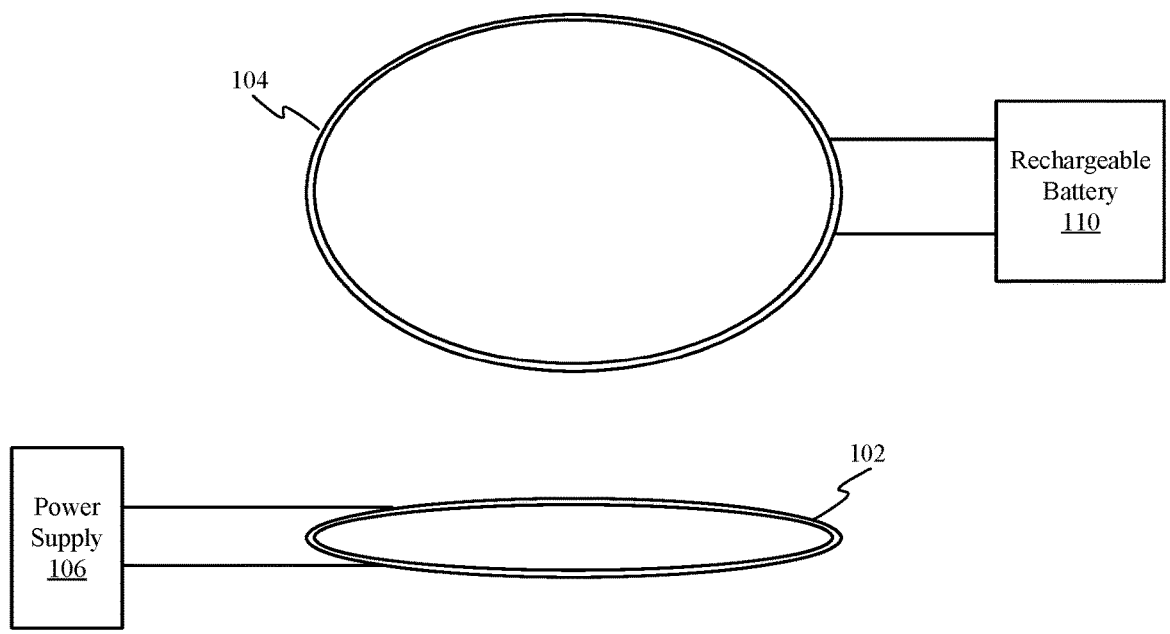

FIGS. 1A-1B depict a transmission coil 102 and a receiver coil 104. Both transmission coil 102 and receiver coil 104 can be formed from multiple loops of electrically conductive wire. In particular, FIG. 1A shows that when transmission coil 102 receives electricity from power supply 106 and is aligned with receiver coil 104, a changing magnetic field 108 is generated that is then at least partially converted back into electrical current within receiver coil 104 when the changing magnetic field interacts with receiver coil 104. The electricity generated in receiver coil 104 can then be used to charge rechargeable battery 110. Unfortunately, when receiver coil 104 is rotated 90 degrees with respect to transmission coil 102, as depicted in FIG. 1B, magnetic field 108 generated by transmission coil 102 has little to no capability to generate current within receiver coil 104. For this reason, conventional chargers have relied upon precise alignment of receiver and transmission coils for wireless charging.

Figure 2A:
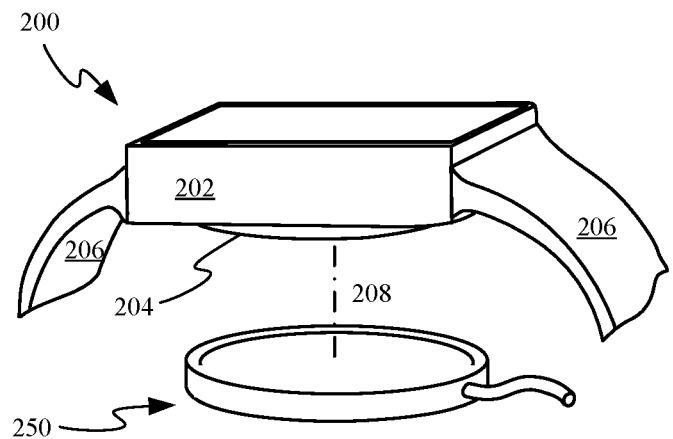
FIG. 2A shows a perspective view of a wearable electronic device and how it is aligned with a wireless charging device.

FIG. 2A shows electronic device 200, which can include a housing 202 having a magnetically permeable window 204. Magnetically permeable window 204 can be made up of materials along the lines of crystal, glass or polymers, while housing 202 can be made up of less magnetically permeable materials such as aluminum and steel. Electronic device 200 can also include wristband 206 for securing electronic device 200 to a wrist of a user. While electronic device 200 is depicted as a wearable device, it should be understood that similar configurations could be achieved with many types of rechargeable device. A magnetic field generated by wireless charging device 250 can generate current in a receiver coil disposed within housing 202 when a receiving coil of electronic device 200 is aligned with an axis 208 of wireless charging device 250 that corresponds to the orientation of a transmission coil within wireless charging device 250. In some embodiments, axis 208 can correspond to a longitudinal axis of the transmission coil. This charging configuration corresponds to the magnetic charging configuration depicted in FIG. 1A. In some embodiments, electronic device 200 and wireless charging device 250 can include magnets configured to align electronic device 200 with axis 208 of charging device 250. Electronic device 200 can also include electronic display 210 positioned on an opposite side of housing 202 from magnetically permeable window 204. In some embodiments, electronic display 210 can take the form of a touch screen configured to display a graphical user interface to a user of electronic device 200.

Figure 2B:
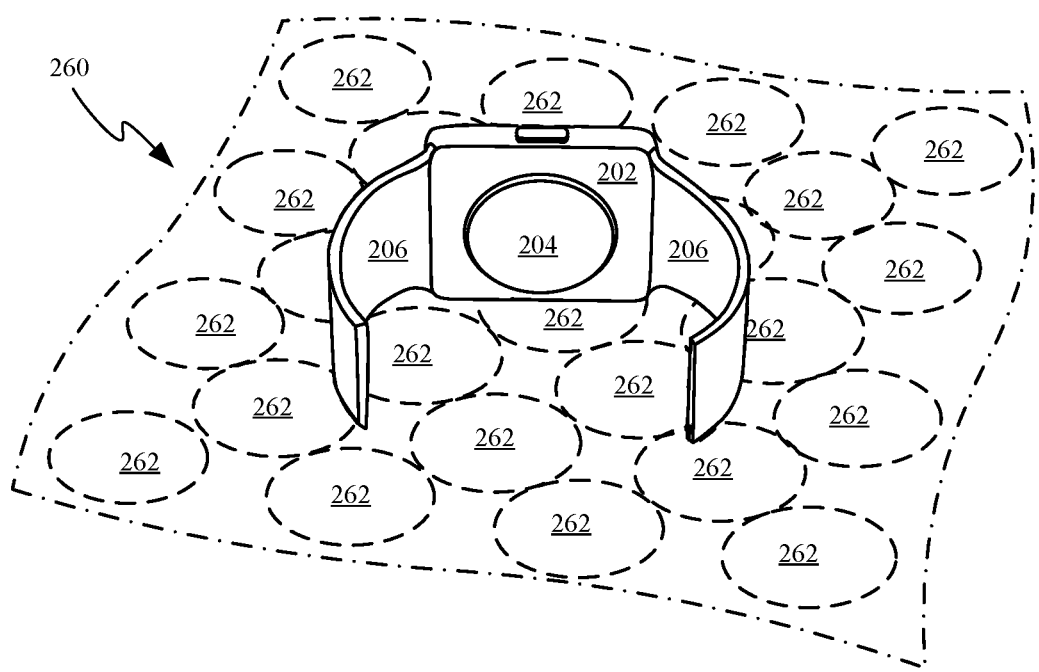
FIG. 2B shows a perspective view of the wearable electronic device depicted in FIG. 2A placed side down on a wireless charging pad.

FIG. 2B shows a perspective view of electronic device 200 positioned upon a region 260 of a charging pad in an orientation where the receiving coil within electronic device is not aligned with a transmission coil. Region 260 includes numerous transmission coils 262 distributed across a top surface of charging pad 260 so that a magnetic field can be produced in most locations along an upward facing surface of charging pad 260. While each of the depicted transmission coils 262 are shown adjacent to one another, additional layers of transmission coils can be stacked beneath the depicted transmission coils 262 and offset so an overlapping configuration is achieved to provide more continuous magnetic field coverage across the surface of charging pad 260. In some embodiments, transmission coils 262 can have a diameter of between about 20 mm and 30 mm. While the charging pad provides a convenient way to recharge an electronic device, a user may not want to be required to place a device in a particular orientation on the pad. The depicted position of electronic device 200 can be a common orientation to place a wrist-mounted device after taking it off. Unfortunately, since electronic device 200 is resting on its side the inductive charging coil within electronic device 200 now resembles the non-charging configuration shown in FIG. 1B and therefore generates little to no charge in electronic device 200. In addition to having a coil geometry problem, when housing 202 is formed from a non-magnetically permeable material, this new orientation results in magnetically permeable window 204 being oriented away from the direction of the magnetic field being emitted by charging pad 260. It should be noted that while a specific exemplary device resembling a watch has been depicted in FIGS. 2A-2B, the described embodiments can be utilized with any number of device types. For example, wireless headphones, cell phones and media players could all use a similar design to charge on a charging pad using similarly oriented charging coils.

Figure 3A:
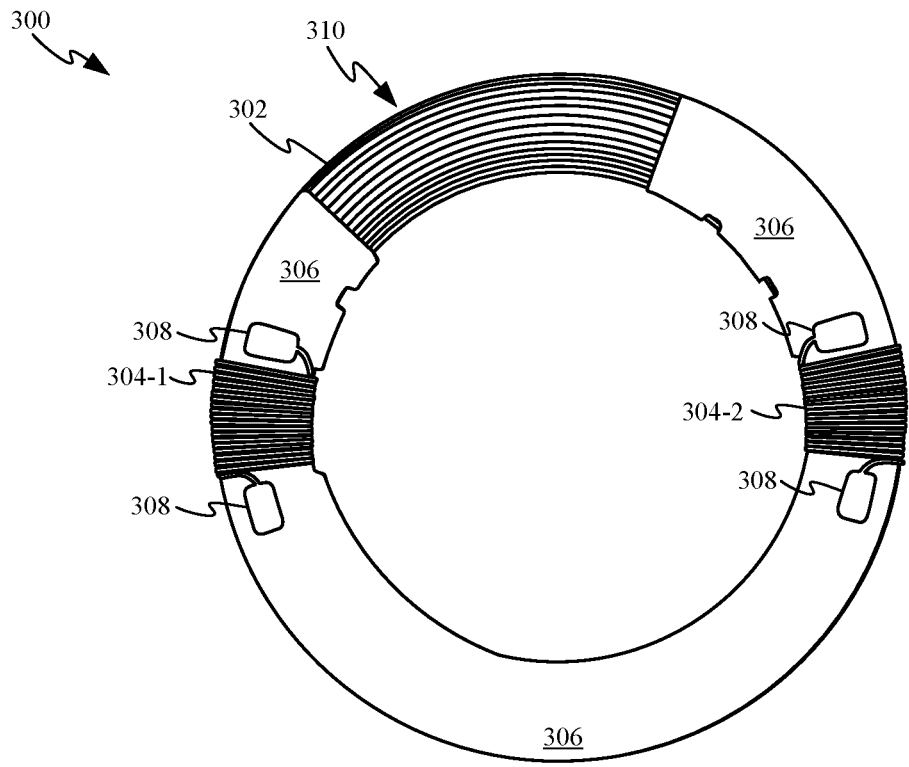
FIG. 3A shows a top view of a wireless charging assembly.

FIG. 3A shows an inductive charging system 300 configured to receive power from magnetic fields oriented in multiple directions. Inductive charging system 300 includes a primary inductive charging coil 302 that can be positioned within an electronic device, such as electronic device 200, to receive electrical energy through a magnetically permeable window, such as magnetically permeable window 204 shown in FIGS. 2A-2B. Secondary coil assembly 304 is depicted as two lengths of wire forming two separate coils wrapped around opposing sides of primary inductive charging coil 302 and AC shield 306. As depicted, secondary coil assemblies 304 are wound around a radial width of inductive charging system 300. The radial width of inductive charging system 300 corresponds to the distance between an inner and outer diameter of inductive charging system 300.

FIG. 3A also shows how each of the coils making up secondary coil assembly 304 can include two terminals 308 at opposing ends of the length of the wire that makes up the coil. In some embodiments, the individual wrappings of secondary coil assembly 304 can be wound to achieve a pitch of one coil per degree and the wires making up the secondary coil assembly can be 36-gauge magnetic wire. The number of coil loops can correspond to the frequency of the magnetic field emitted by transmission coils 262. For example, while 19 coil wrappings can be sufficient to receive energy from a magnetic field changing at a frequency of about 7 MHz, 53 coil wrappings can be better suited to receive energy from a magnetic field changing at a lower frequency of about 300 kHz.

AC shield 306 can be formed from a ferritic alloy, such as MnZn or NiZn, having good magnetic permeability. For example, AC shield 306 can take the form of a sintered powder press core, formed at least in part by a compression molding operation. While this type of formation operation can limit the complexity of the shape of AC shield 306, various shaping operations such as a grinding operation can be applied to the powder press core to achieve more complex shapes. AC shield 306 can also take the form of a ferritic sheet or composite material such as a polymer with embedded ferritic particles. The magnetic permeability achieved by the use of these materials allows AC shield 306 to perform well in attracting magnetic flux emitted by charging pad 260. The resulting increase in magnetic flux flowing through the coils of secondary coil assembly 304 commensurably increases the efficiency with which secondary coil assembly 304 is able to receive electrical current.

Magnetically permeable materials used in the construction of AC shields generally have magnetic permeability that increase with temperature. The permeability increases until it hits a maximum at which point the magnetic permeability starts to drop off. The drop off temperature for these materials is often in excess of 200 degrees C. This temperature is clearly above a temperature at which electronic devices can operate safely. For at least this reason, the material being used to form AC shield 306 can be selected so that its magnetic permeability peaks at a much lower temperature. For example, by choosing a magnetic permeability that peaks at 50 degrees C., the magnetic permeability can be maximized at a temperature that is more common for an electronic device. In some embodiments, the magnetic permeability of the material can decrease at a faster rate than it increased. When the peak temperature is designed to coincide with a maximum recommended charging temperature for a charged device, the rapid reduction in magnetic permeability can be operative to reduce a magnetic coupling between a charging device and the charged device. The charging device can then be configured to terminate the charging operation in response to the rapid reduction in strength of the magnetic coupling consistent with a temperature overage.

At a high level, inductive charging configurations can be classified in two categories: tight couplings and loose couplings. In a tight coupling, precise alignment and distance are required but yield a high efficiency power transfer. Primary coil 310 would generally be utilized in a tight coupling configuration. In a loose coupling, alignment and distance are less important but still have substantial effect on the overall power transfer efficiency. In loose coupling configurations, such as in the case of an orthogonal charging configuration where the magnetic coupling is weaker to begin with, the accompanying magnetic permeability reduction can make the magnetic coupling undetectable. By configuring the charging device to terminate charging in response to the magnetic permeability reduction, AC shield 306 can act as an emergency shutoff for wireless charging that can prevent a possible heat damage event. For example, the failure of a local air conditioning unit could cause a rapid rise in ambient temperature that could result in the charged device heating up too rapidly during charging. In such a case, where the material of AC shield 306 had a magnetic permeability temperature profile matching temperature operating limits of the charged device a heat damage event could be avoided.

In some embodiments, two of terminals 308 can be used to electrically couple coils 304-1 and 304-2 of secondary coil assembly 304 together. AC shield 306 can include a dedicated electrically conductive pathway for electrically coupling coils 304-1 and 304-2 together. In some embodiments, the dedicated electrically conductive pathway can take the form of a flex arranged along a top surface of AC shield 306. Another one of terminals 308 can electrically couple secondary coil assembly 304 with a battery of electronic device 200. In some embodiments, the same flex can be used both to electrically couple coils 304-1 and 304-2 together and to electrically couple coils 304-1 and 304-2 to a battery. FIG. 3A also illustrates how coils 304-1 and 304-2 of secondary coil assembly 304 can be oriented in substantially the same direction, a direction that is orthogonal with respect to the orientation of primary inductive charging coil 302 without taking up a substantial amount of additional room within electronic device 200. By virtue of being oriented orthogonally with respect to primary inductive charging coil 302, in certain specific orientations the coils making up secondary coil assembly 304 are therefore able to receive energy from a magnetic field when primary inductive charging coil 302 cannot. AC shield 306 includes a gap 310 that can help improve the efficiency of inductive charging system 300. In some embodiments, and as depicted, gap 310 can be placed in AC shield 306 to help improve charging efficiency in situations where the magnetic field being received by inductive charging system 300 is not evenly distributed to both coils making up secondary coil assembly 304. Gap 310 in AC shield 306 allows the two sections making up secondary coil assembly 304 to be decoupled so each can operate at peak efficiency instead of having one of the coils reduce the efficiency of the other coil in the event of an unevenly distributed magnetic field. This gapped configuration is more effective when electronic device 200 is positioned on its side in an orientation that causes the side of magnetic charging assembly 300 that includes gap 310 to be facing away from the charging pad. This orientation allows a greater amount of the ferrite making up AC shield 306 to be closer to an inductive charging surface and direct magnetic flux from the charging pad to the coils of secondary coil assembly 304 that is able to more efficiently receive the energy. Without gap 310, the magnetic flux is distributed more evenly between coils 304-1 and 304-2, which can reduce charging efficiency when the magnetic field emitted by the charging pad is stronger for one of the coils than the other coil. In some embodiments, it can be desirable to orient gap 310 so that it is closer to the charging pad when user interface element 308 is facing down, since the improved performance helps to counteract the reduction in charging efficiency resulting from user interface element 308 lifting inductive charging system 300 a little farther away from an inductive charging surface.

Figure 3B:
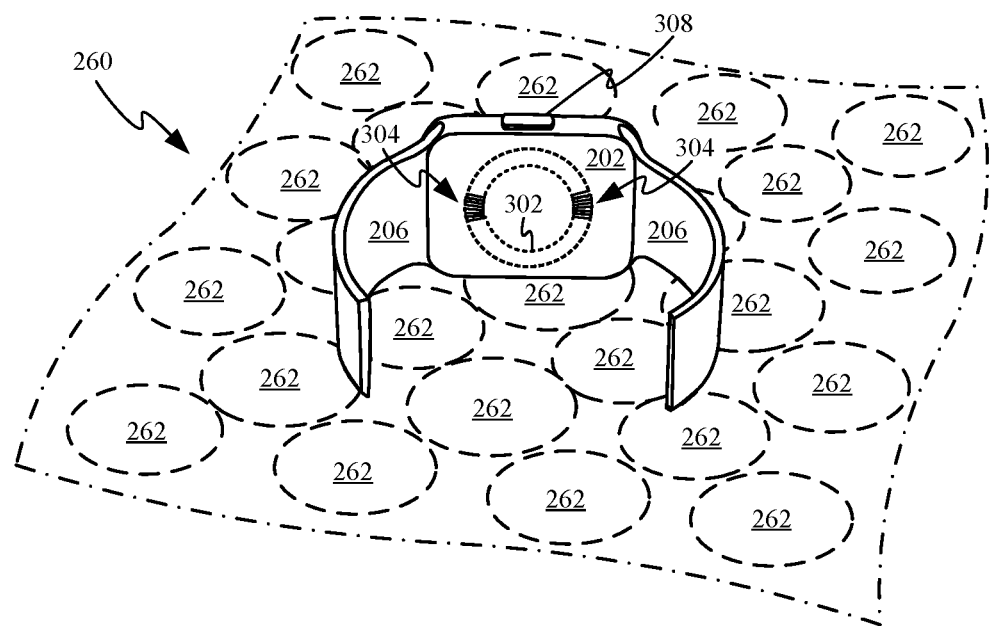
FIG. 3B shows the wireless charging assembly depicted in FIG. 3A disposed within a wearable electronic device positioned on a wireless charging pad.

FIG. 3B shows how inductive charging system 300 can be positioned within electronic device 200. The depiction shows how positioning inductive charging system 300 can be especially useful on account of electronic device 200 having a limited number of orientations in which it can be set down on charging pad 260. For example, electronic device 200 could be set face down, face up or on either side. Wristband 206 limits the number of orientations electronic device 200 can be easily placed in when resting on its side to two orientations. By positioning the coils of secondary coil assembly 304 on a portion of primary inductive charging coil 302 that causes secondary coil assembly 304 to be oriented towards charging pad 260, secondary coil assembly can receive electrical energy whenever electronic device 200 is placed on its side. The position of the coils of secondary coil assembly 304 can also be described as corresponding to the sides of housing 202 that include attachment points for coupling wristband 206 to housing 202. It should be noted that while the attachment points for electronic device 200 are depicted as channels other wristband attachment points are also possible, such as for example, a set of loops around which each side of a wristband can rotate.

Figure 3C:
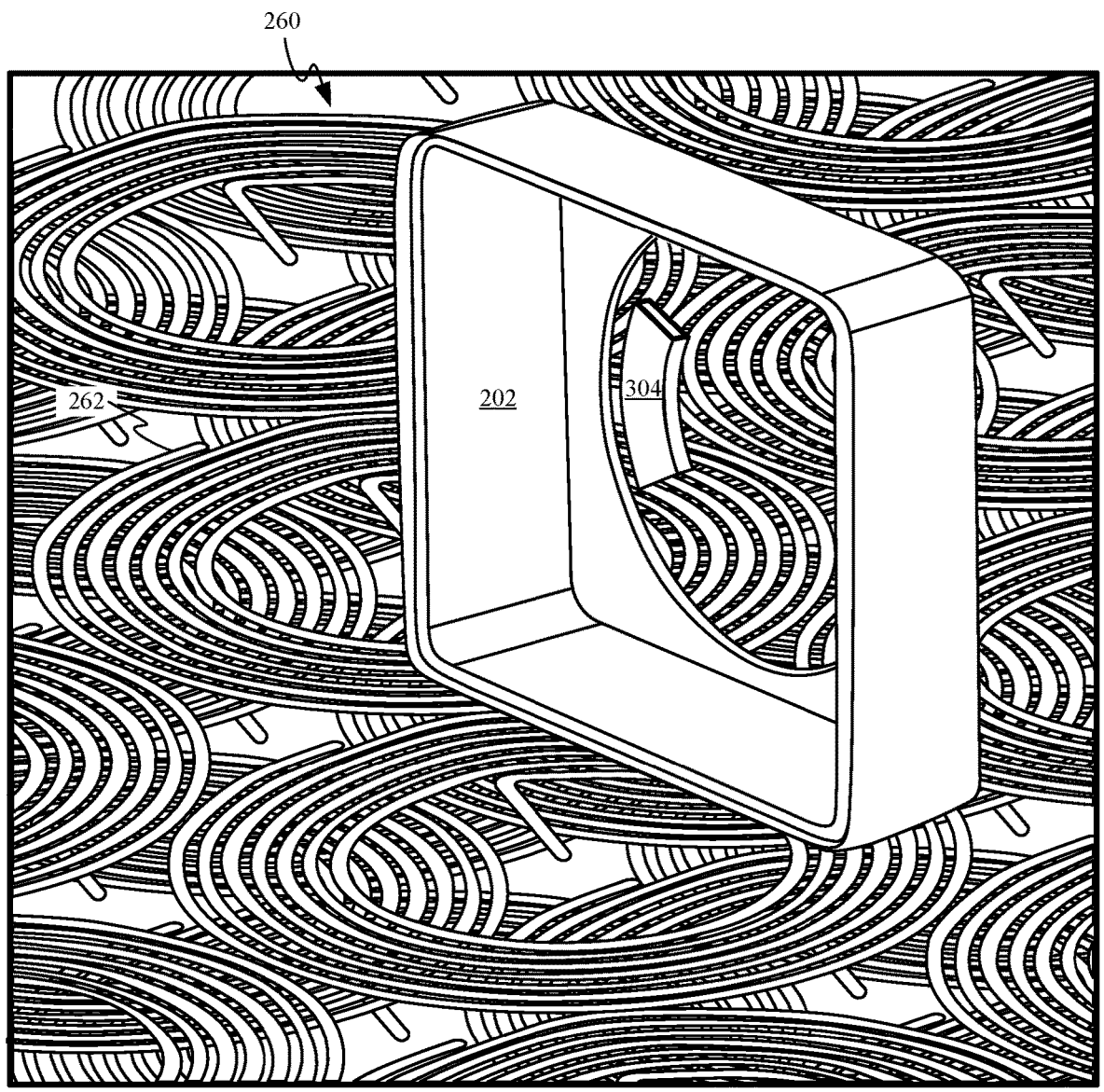
FIG. 3C shows a device housing with internal components removed to show the relative position of one coil of a secondary coil assembly in relation to the housing and a charging pad.

FIG. 3C shows housing 202 with internal components removed to show the relative position of one coil of secondary coil assembly 304 in relation to housing 202. FIG. 3C also shows transmission coils 262 of charging pad 260 arranged in a multi-layer configuration. In some embodiments, transmission coils 262 can be distributed across three separate layers as depicted. By arranging transmission coils 262 in multiple layers, the transmission coils can be packed more densely without running into problems of overlapping coils coming into direct contact. For example, a thin matrix of transmission coils can be created by distributing transmission coils 262 onto laminated layers of a polymeric substrate. In other embodiments, each of transmission coils 262 can be formed from stranded wires, which while increasing the thickness of each layer could also increase the efficiency with which transmission coils 262 generate a magnetic field. As depicted, each of the patterns of transmission coils 262 can be offset so that a uniform magnetic output density can be achieved. In this way, a more uniform magnetic field can be applied to and received by secondary coil assembly 304. It should be appreciated that a greater or smaller number of layers can be utilized depending on the desired magnetic field intensity and uniformity. It should also be noted that in some embodiments charging pad 260 can be configured to energize only those transmission coils 262 that are close enough to secondary coil assembly 304 to generate a magnetic field that induces a current in at least one of the coils of secondary coil assembly 304. A location of secondary coil assembly 304 with respect to transmission coils 262 can be determined in any number of ways. In some embodiments, a surface of charging pad 260 can include a sensor configured to identify a location and orientation of electronic device 200. For example, a capacitive sensor can be configured to detect contact between housing 202 and the capacitive sensor. In some embodiments, a power expenditure can be measured when all of transmission coils 262 are energized and then only those transmission coils 262 with the largest variations caused by interaction with a receiving coil of an electronic device can remain energized. In this way, no additional energy need to be expended energizing transmission coils that are not being utilized.

Figure 3D:
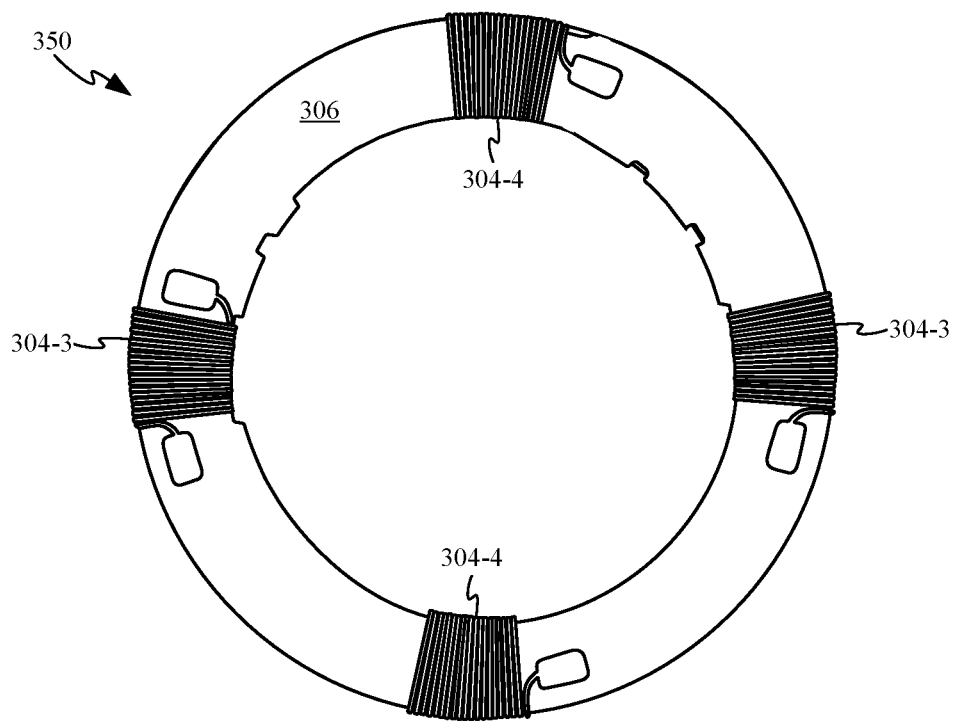
FIGS. 3D-3E show alternative wireless charging assembly embodiments.
Figure 3E:
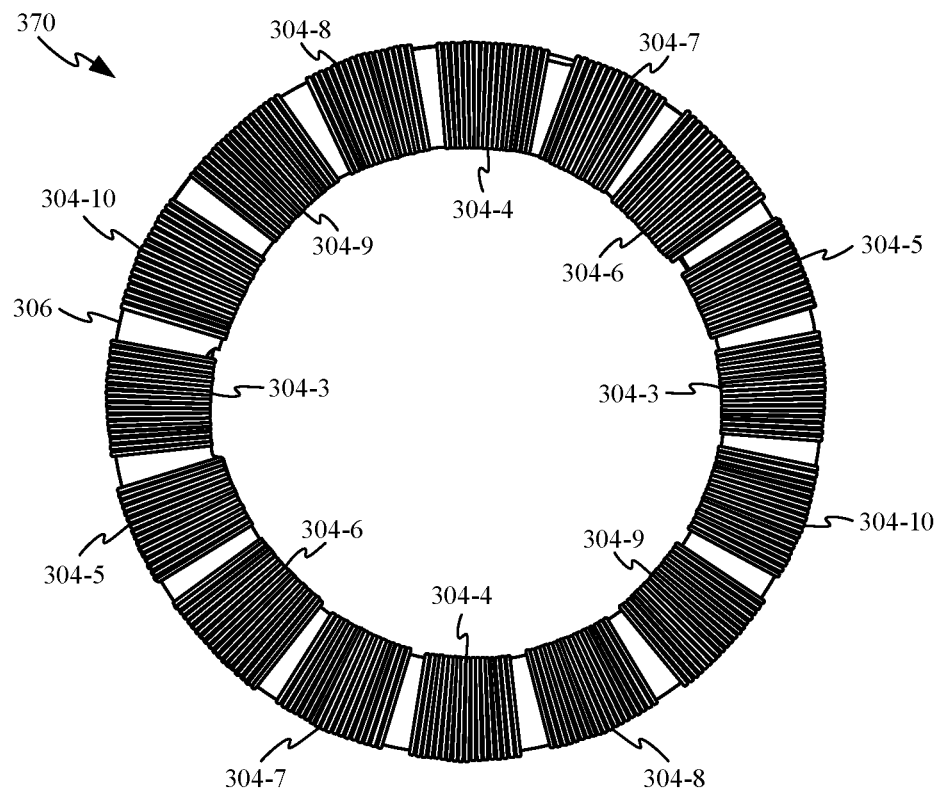

FIGS. 3D-3E show alternative wireless charging assembly embodiments. In particular, wireless charging assembly 350, as depicted in FIG. 3D, includes secondary coil assembly 304, which includes opposing coils 304-3 and 304-4. By arranging opposing coils 304-3 90 degrees away from opposing coils 304-5, a device with a rectangular housing utilizing wireless charging assembly 350 could receive energy while placed on any of its four sides. FIG. 3E depicts wireless charging assembly 370, which includes a secondary coil assembly 304 made up of opposing coils 304-3, 304-4, 304-5, 304-6, 304-7, 304-8, 304-9 and 304-10. As depicted, each of the opposing coils surrounds a portion of AC shield 306 as well as around primary inductive charging coil 302 in some embodiments. Wireless charging assembly 370 can be configured to allow charging in any number of radial orientations for a housing having a great number of different lateral resting positions. For example, wireless charging assembly 370 can be configured to enable charging of a cylindrical device housing in any radial orientation. Similarly, wireless charging assembly 370 could be configured to support orthogonal charging of a housing with an octagonal cross-section. Additional cross-sectional shapes with various numbers of sides can also be supported by wireless charging assembly 370. In some embodiments, the device receiving power through wireless charging device 370 can include an orientation sensor configured to activate particular opposing coils of secondary coil assembly 304 after determining an orientation of the device. For example, in the depicted orientation inputs from an orientation sensor could be used to identify opposing coils 304-3 as the best positioned to receive power. When none of the opposing coils are precisely aligned with a magnetic charging field, an orientation of the device could result in a sensor readying from the orientations sensor indicating multiple sets of opposing coils should be activated to maximize energy transfer.

Figure 4A:
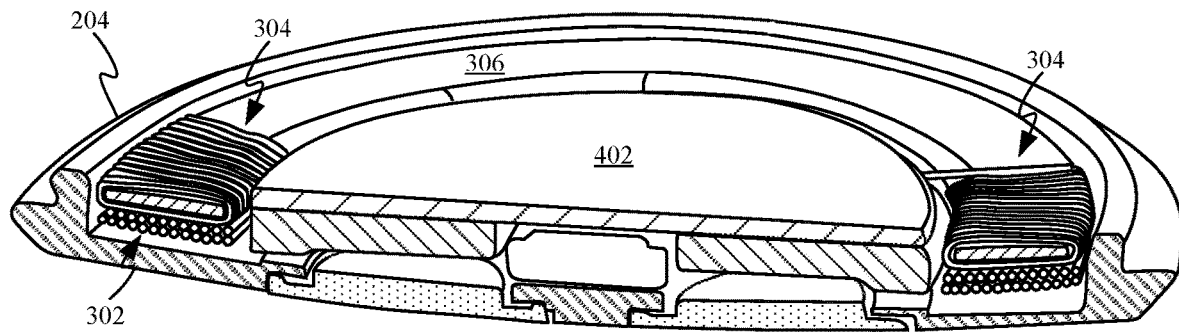
FIGS. 4A-4B show cut-away perspective views of various wireless charging assembly configurations positioned within an electronic device.
Figure 4B:
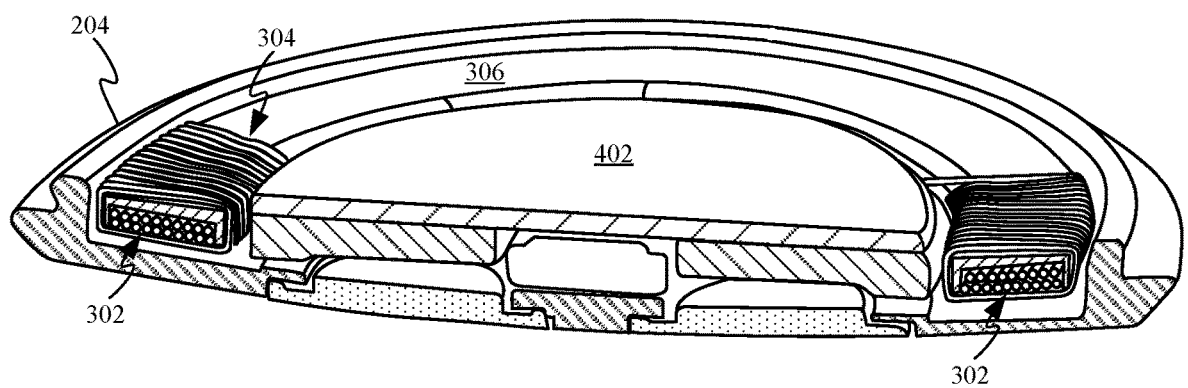

FIGS. 4A-4B show cut-away internal perspective views of inductive charging system 300 positioned within magnetically permeable window 204 of electronic device 200. As described above, positioning inductive charging system 300 within magnetically permeable window 204 can reduce any dampening effect the less magnetically permeable materials making up housing 202 (not depicted). FIGS. 4A-4B show primary inductive charging coil 302 routed around a periphery of magnetically permeable window 204. In FIG. 4A, primary inductive charging coil 302 is positioned beneath AC shield 306. AC shield 306 can be formed of ferritic material and configured to prevent electromagnetic radiation from affecting other portions of electronic device 200 positioned above AC shield 306. In some embodiments, electronic device 200 can also include shield 402, which can be configured to shield a central portion of electronic device 200 from electromagnetic interference caused by a wireless charging device. In some embodiments, shield 402 can take the form of a stainless steel plate. In embodiments where a printed circuit board is positioned directly above inductive charging system 300, the printed circuit board can include a layer of metal facing inductive charging system 300 that reduces or prevents magnetic field interference from adversely affecting electrical components support by the printed circuit board. FIG. 4A also shows how secondary coil assembly 304 can be wrapped around opposing sides of AC shield 306. Because AC shield 306 is formed of ferritic material it can be helpful in providing a conduit along which magnetic flux can travel and be concentrated, so that an amount of electrical current induced in secondary coil assembly 304 can be increased.

FIG. 4B shows secondary coil assembly 304 wrapped around both AC shield 306 and primary inductive charging coil 302. When the wires making up primary inductive charging coil 302 are coated in ferritic material, wrapping secondary coil assembly 304 around both AC shield 306 and primary inductive charging coil 302 increases the efficiency at which secondary inductive coil assembly receives energy on account of the additional ferritic material coating the wires of primary inductive charging coil 302 since the ferritic material coating helps to draw magnetic flux through the coils making up secondary coil assembly 304. It should be noted generally that in the configurations identified in FIGS. 4A and 4B that direct contact between primary inductive charging coil 302 and AC shield 306 can increase the charging efficiency of primary inductive charging coil 302.

Figure 5A:
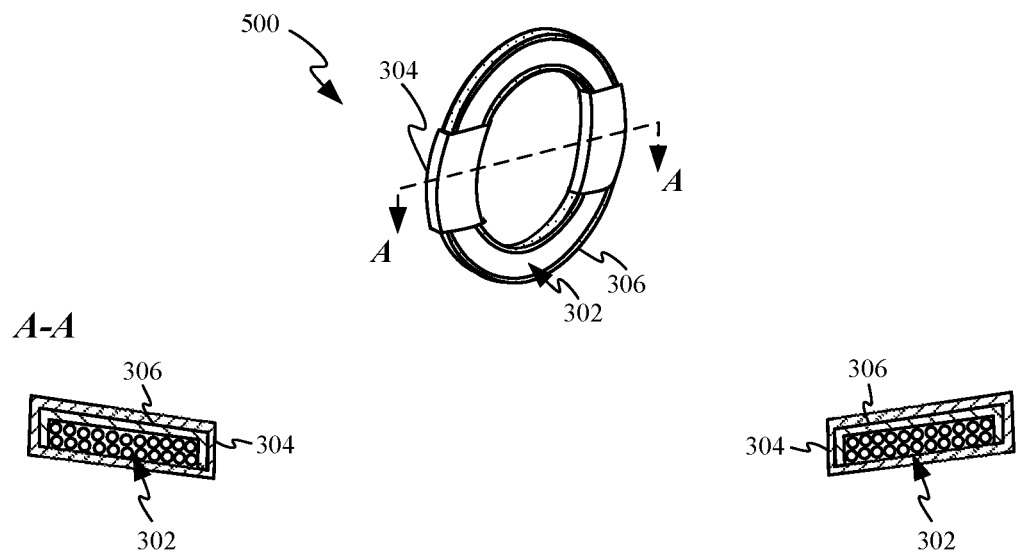
FIGS. 5A-5G show various inductive charging coil configurations.

FIG. 5A shows perspective and cross-sectional views of wireless charging system 500. In particular, primary inductive charging coil 302 is shown positioned within a channel defined by AC shield 306. Secondary coil assembly 304 is depicted wrapped around opposing sides of primary inductive charging coil 302. This configuration allows secondary coil assembly 304 to receive electrical energy from a shifting magnetic field out of alignment with primary inductive charging coil 302. The cross-sectional depiction is shown in accordance with section line A-A and depicts how secondary coil assembly 304 surrounds two portions of primary inductive charging coil 302. In some embodiments, primary inductive charging coil 302 takes the form of wound copper wires coated in an iron alloy. The iron coating the copper wires cooperates with the ferritic material in AC shield 306 to draw magnetic flux through secondary coil assembly 304, which induces electrical current that can be used to charge an associated electronic device battery.

Figure 5B:
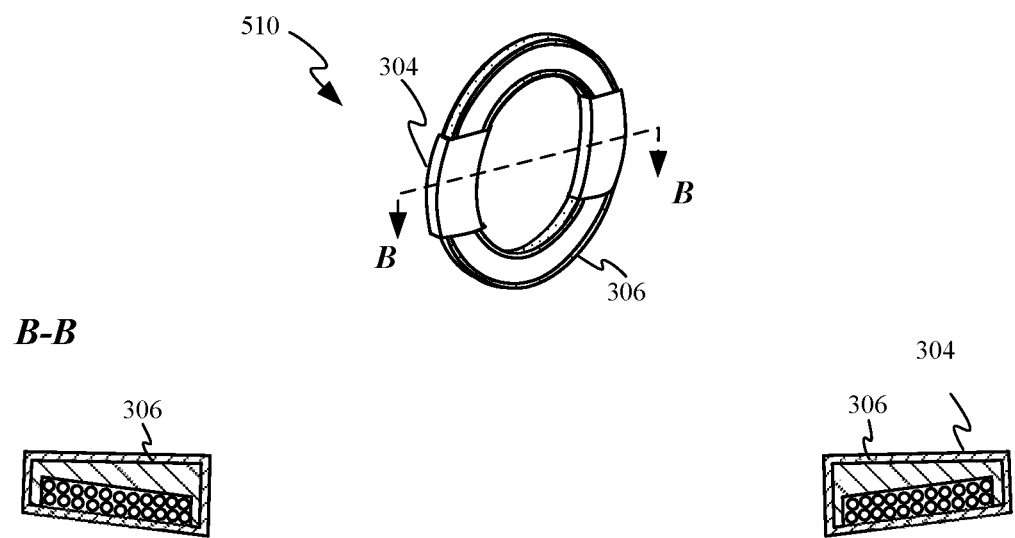

FIG. 5B shows wireless charging system 510, which has a similar configuration to wireless charging system 500. Wireless charging system 510 differs from wireless charging system 500 in that a top portion of AC shield 306 has a varying thickness that allows the top of wireless charging system to be substantially flat when the system is installed in a magnetically permeable window having a convex geometry, as depicted in the view representing Section Line B-B. Furthermore, because a portion of AC shield 306 is thickened, this results in additional ferritic material being positioned within the coils making up secondary coil assembly 304, which can beneficially increase the efficiency of secondary coil 304 at collecting electrical energy.

Figure 5C:
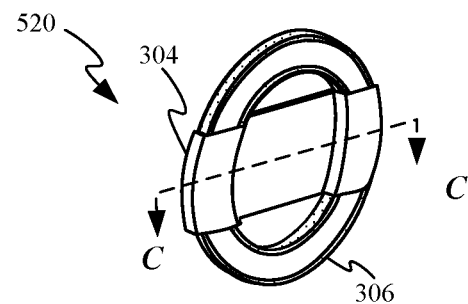
Figure 5C:
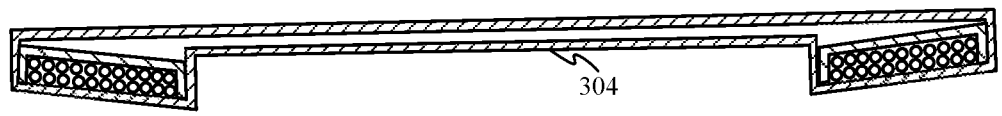
Figure 5D:
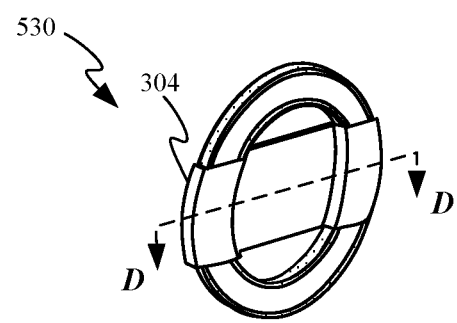
Figure 5D:
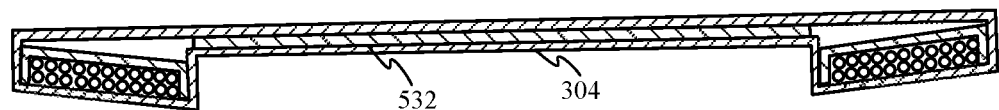

FIG. 5C shows perspective and cross-sectional views of wireless charging system 520. Wireless charging system 520 differs from the previous wireless charging systems on account of secondary coil assembly 304 extending around a portion of AC shield 306 that includes both sides of AC shield 306. In this way, secondary coil assembly 304 extends around a width of AC shield 306 and primary inductive charging coil 302. This configuration can increase the size of the area encompassed by secondary coil 304, thereby increasing the performance of secondary coil 304 in certain situations. FIG. 5D shows a wireless charging system 530 having a configuration similar to the one depicted in FIG. 5C. Wireless charging system 530 includes a ferritic sheet 532 disposed within a central portion of secondary coil assembly 304. In some embodiments, this can further increase the efficiency at which secondary coil 304 receives energy since in addition to opposing magnetic flux from entering a central portion of electronic device 200, ferritic sheet 532 can also be configured to draw magnetic flux through secondary coil assembly 304. In this configuration, secondary coil 304 defines two discrete openings through which primary inductive charging coil 302 extends.

Figure 5E:
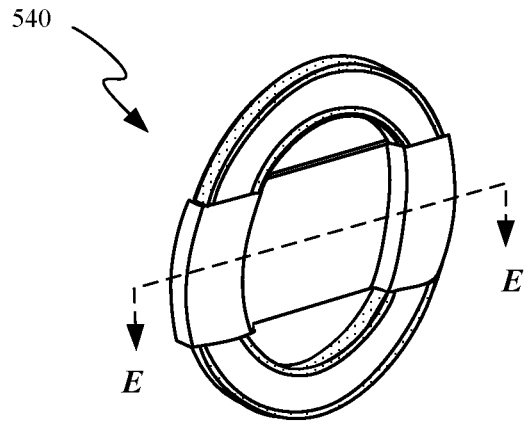
Figure 5E:
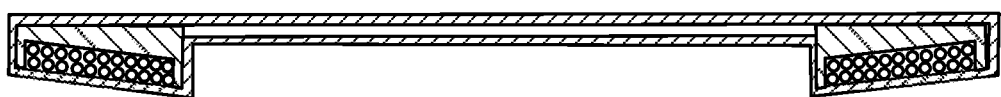

FIG. 5E shows perspective and cross-sectional views of wireless charging system 540, which has a similar configuration to wireless charging system 520. Wireless charging system 540 differs in that a top portion of AC shield 306 has a varying thickness that allows the top of wireless charging system to take up the area between the top of AC shield 306 and secondary coil 304, as depicted in the view of Section Line E-E. Furthermore, because a portion of AC shield 306 is thickened, this results in additional ferritic material being positioned within secondary coil assembly 304, which can beneficially increase the efficiency of secondary coil 304 at collecting electrical energy.

Figure 5F:
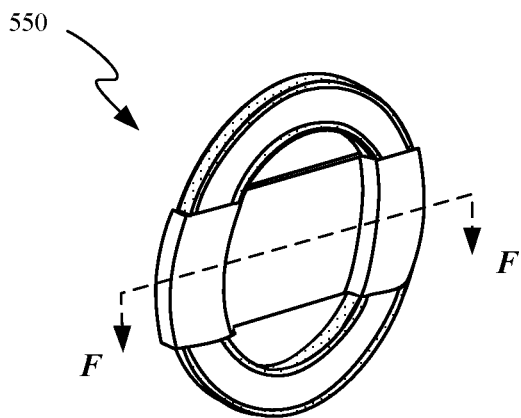
Figure 5F:
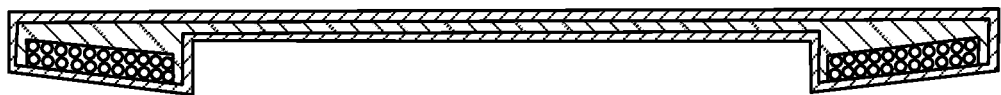
Figure 5G:
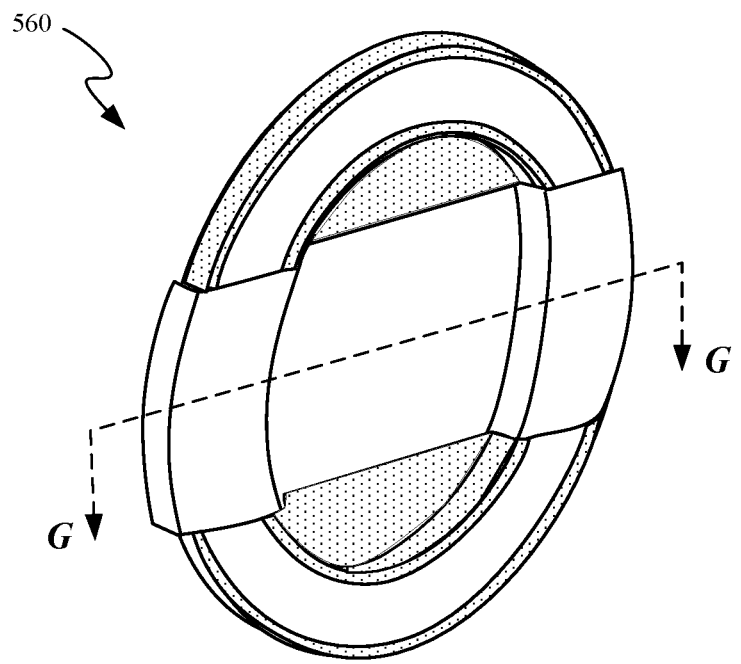
Figure 5G:
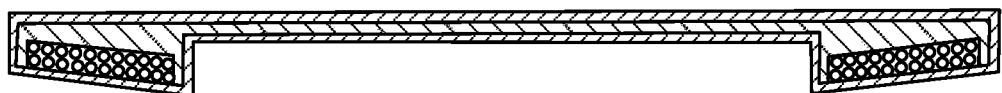

FIG. 5F shows perspective and cross-sectional views of wireless charging systems 550 and 560. Only one cross-sectional view is shown and can apply equally to both section line F-F and G-G on account of that portion of both charging systems looking the same. Wireless charging system 550 differs from wireless charging system 560 in that AC shield extends across a central region defined by the ring formed by AC shield 306, while in wireless charging system 550 the AC shield only extends across a portion of the central region across which the secondary coil assembly extends.

Figure 6A:
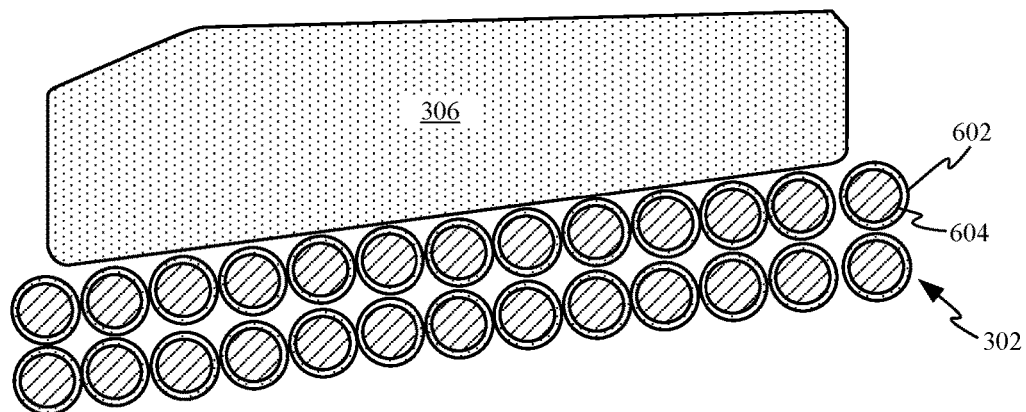

FIGS. 6A-6G show cross-sectional views of various AC shield and primary inductive charging coil embodiments. In particular, FIG. 6A shows a cross-sectional view of one side of primary inductive charging coil 302 and AC shield 306. In this embodiment, a central portion of AC shield 306 is substantially thicker than the peripheral side. This helps to accommodate the downward sloping geometry of the configuration of primary inductive charging coil 302. FIG. 6A also helps to depict how the wires making up primary inductive charging coil 302 can include a copper wire 602 wrapped in ferritic material. In this way, the layer of ferritic material surrounding copper wire 602 increases the amount of ferritic material passing through each of the coils making up the secondary coil assembly (not shown). In this way, the additional ferritic material can increase the efficiency with which the secondary coil assembly receive electrical energy. While the other primary inductive charging coils in this disclosure are not depicted having ferritic coatings or layers, it should be appreciated that any of the depicted primary inductive charging coil configurations in which the secondary coil assembly wraps around the primary inductive charging coil, can benefit from including the ferritic coating/layer on and around the wires making up the primary inductive charging coil. It should be noted that other means for coating primary inductive charging coil 302 with iron material are also possible. For example, a polymer material doped with iron powder can be used to coat primary inductive charging coil 302 and would increase performance over a primary inductive charging coil 302 without a ferritic coating.

Figure 6B:
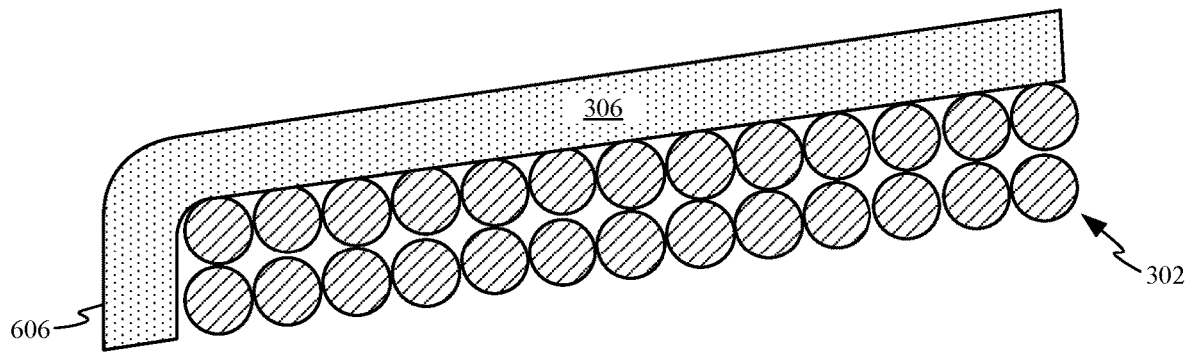

FIG. 6B shows an embodiment in which AC shield 306 includes an arm 606 that extends around one side of primary inductive charging coil 302. This arm can prevent the magnetic field from interacting and/or interfering with sensors or magnetically sensitive electronic assemblies located within a central portion of AC shield 306.

Figure 6C:
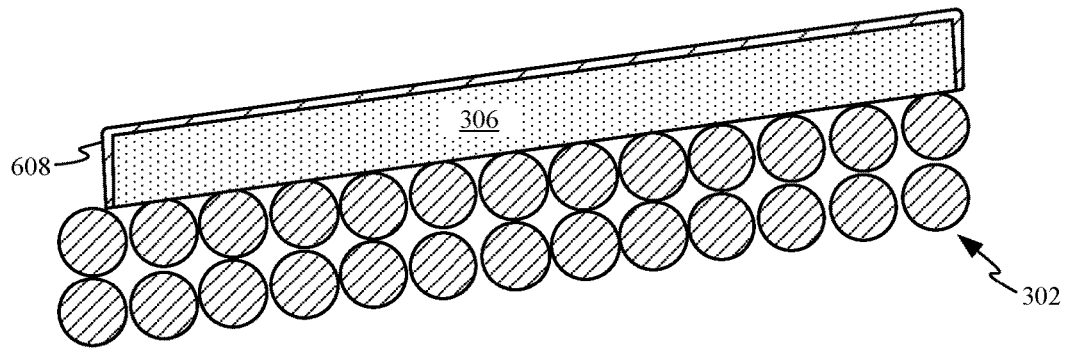

FIG. 6C shows how AC shield 306 can also have a uniform thickness following a top edge of primary inductive charging coil 302. In this embodiment, upper surfaces of AC shield 306 are coated in epoxy layer 608. Epoxy layer 608 can help to give AC shield 306 a smooth finish less likely to include a sharp corner or other defect with the potential to damage wires of the primary or secondary inductive coils. In addition to protecting the inductive coils from physical damage, epoxy layer 608 also creates a small gap between AC shield and each winding of secondary coil assembly 304 (not shown). The small gap can improve the transmission of electricity to secondary coil assembly 304 by virtue of keeping the magnetically permeable material of AC shield 306 out of direct contact with the wires making up secondary coil assembly 304. In some embodiments, all surfaces of AC shield 306 can be covered in epoxy layer 608. It should be noted that epoxy layer 608 can be used with any of the other embodiments that include an AC shield.

FIGS. 6D-6G show embodiments in which an AC shield is formed by joining multiple ferritic components together to arrive at a desired shape or configuration of AC shield 306. The previously mentioned difficulty in forming complex shapes with a sintered powder press core can be addressed at least in part by the addition of the depicted ferritic components. For example, in FIG. 6D ferritic component 306-1 takes the form of a uniformly thick ferritic component and ferritic component 306-2 takes the form of a uniformly thick component having a central arm 606 that wraps around one side of primary inductive charging coil 302. The resulting shape, which has a varying thickness, is much easier to form in this way than it would be much more difficult to create the shape as a single piece.

FIG. 6E shows a tapered ferritic component 306-1 cooperating with a uniformly thick ferritic component 306-2 to form a wedge shaped AC shield 306. Generally, ferritic components 306-1 and 306-2 of any of the depicted configurations can be joined together in many ways, including for example by adhesive or by partially melting the ferritic components together. Furthermore, in some embodiments, the material used to create ferritic components 306-1 and 306-2 can be different. For example, a first iron alloy can be used to form ferritic component 306-1, which is more effective at inducing magnetic flux while a second iron alloy used to form ferritic component 306-2 can be more effective for forming a magnetic shunt. Furthermore, while two separate pieces are depicted being joined together, it should be appreciated that three or more pieces could be joined together in a similar manner.

Figure 7A:
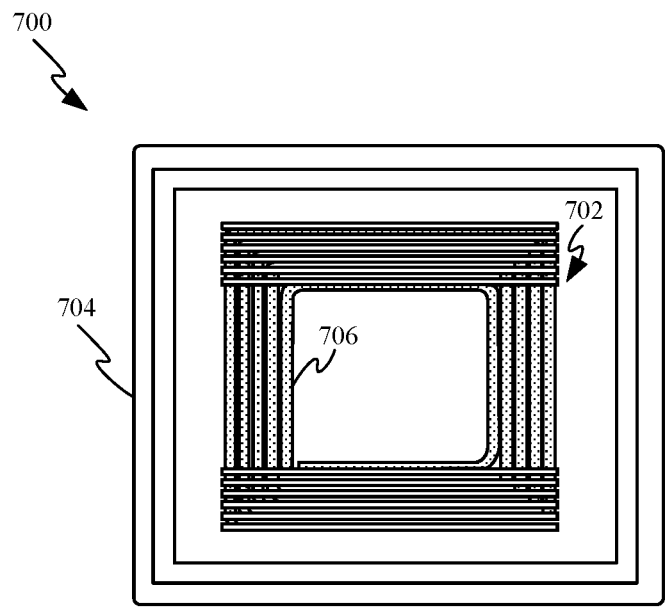
FIGS. 7A-7B show a top view and a perspective view of a secondary charging coil wrapped around a rectangular sheet of ferritic material.
Figure 7B:
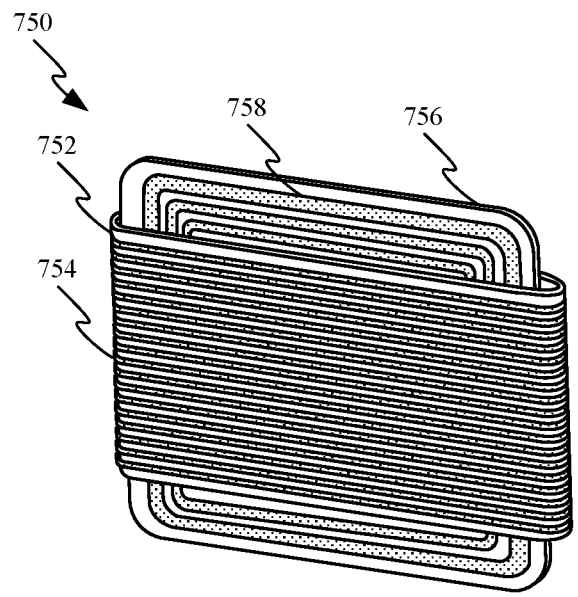

FIGS. 7A-7B show an alternative secondary coil configuration for an electronic device 700. FIG. 7A shows a secondary coil assembly 702 disposed within a housing 704. In this embodiment, secondary coil assembly 702 is located on an opposite side of housing 704 from a primary inductive charging coil (not shown). This type of configuration can be beneficial when the electronic device is placed display down on a charging pad as it positions secondary coil assembly 702 in close proximity to the charging pad. Furthermore, by wrapping the coils of secondary coil assembly 702 around antenna 706 little or no extra space is taken up by secondary coil assembly 702. Because the central portion of antenna 706 is left uncovered, antenna 706 can be connected to other devices within housing 704.

FIG. 7B shows an alternative secondary coil assembly in which a complex wire wrapping step can be avoided by wrapping secondary coil assembly 752, which can take the form of a polymeric sheet having a pattern of electrically conductive traces 754, around ferritic sheet 756. In some embodiments, ferritic sheet 756 can include its own coil or antenna pattern 758. Coil 758 can be formed on ferritic sheet 756 in many ways such as by an electroplating or thin film deposition process. In some embodiments, secondary coil assembly 750 is positioned on ferritic sheet 756 in a location and orientation that avoids interference with the operation of coil or antenna pattern 758. It should be noted that in some embodiments, an inductive charging coil wrapped around antenna 706, as shown in FIGS. 7A-7B, can be used to augment power received by a secondary charging coil wrapped around a primary charging coil as shown in FIGS. 4A-4B.

Figure 7C:
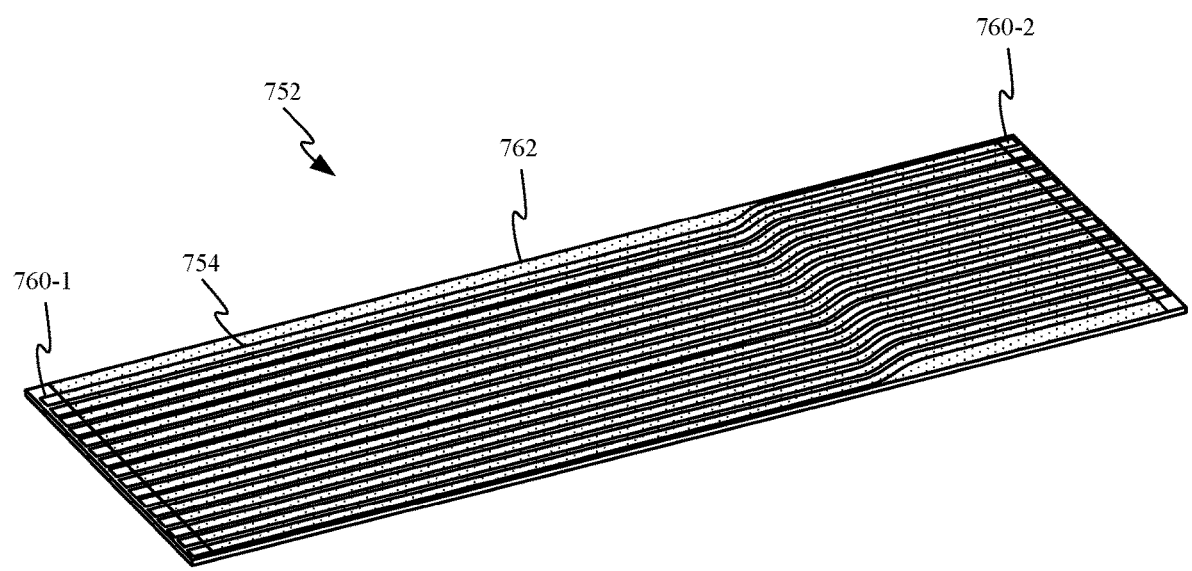
FIG. 7C shows a perspective view of a secondary coil assembly laid flat.

FIG. 7C shows a perspective view of secondary coil assembly 752 laid flat. Here it can be seen how electrically conductive traces 754 are arranged so that by wrapping secondary coil assembly 752 in a loop, exposed ends 760-1 of electrical traces 754 are electrically coupled together to a respective ones of exposed ends 760-2 to form a series of coils. In some embodiments, only upward-facing surfaces of exposed ends 760-1 are exposed and downward-facing surfaces of exposed ends 760-2. Exposed ends 760-1 and 760-2 can be soldered or fused together to create a robust electrical connection across an interface through which the electrically conductive traces 754 extend. In some embodiments, a central region 762 of secondary coil assembly 752 can include an insulating layer designed to prevent inadvertent shorts across electrically conductive traces 754.

Figure 8:
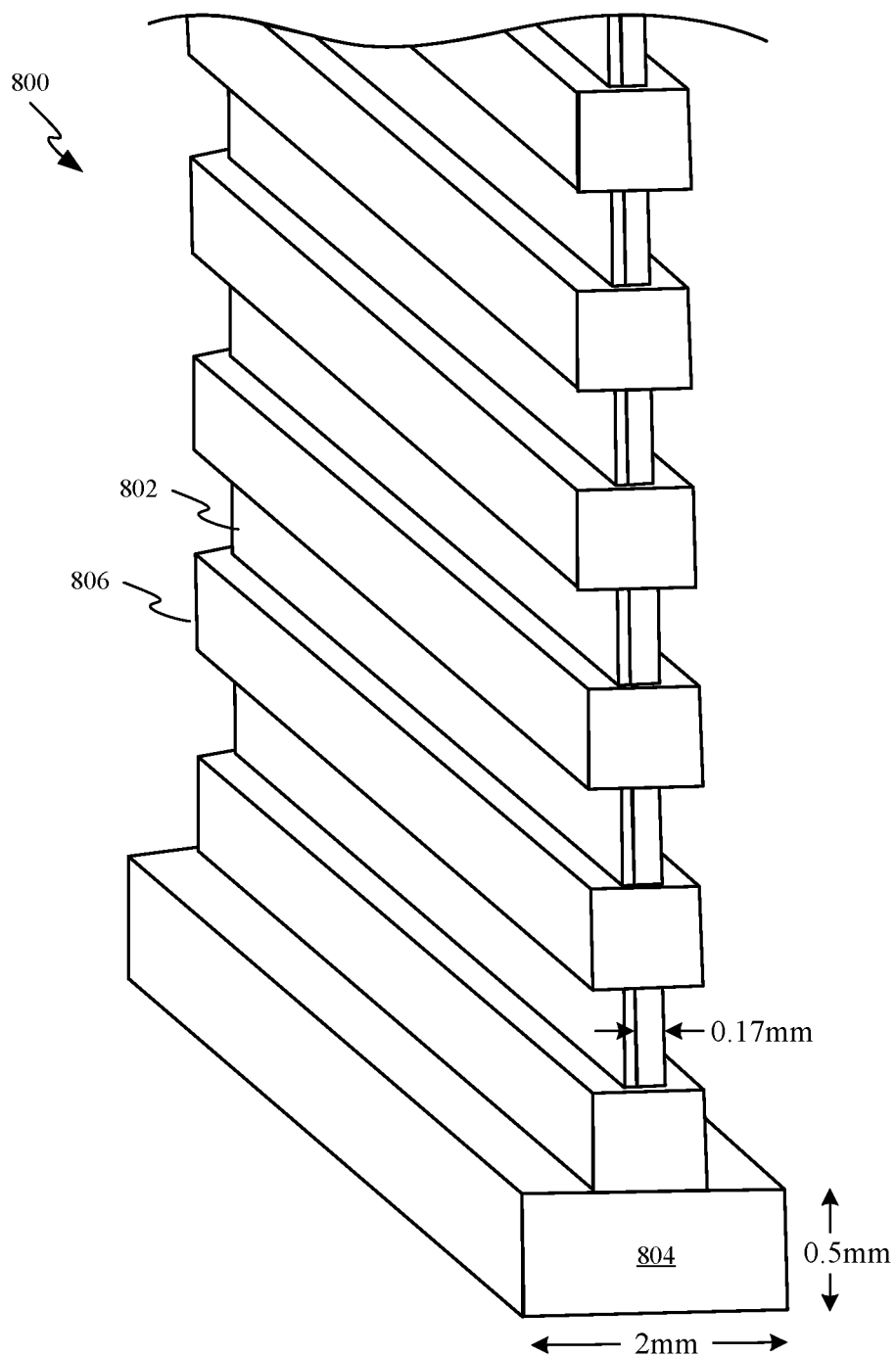
FIG. 8 shows a perspective view of a ferritic sheet assembly having a ferritic block at one end of the ferritic sheet assembly for collecting magnetic flux.

FIG. 8 shows one end of a ferritic sheet assembly 800 similar to the one depicted in FIGS. 7A-7B. In particular, ferritic sheet assembly 800 includes a ferritic sheet 802 and a ferritic block 804 disposed at one end of ferritic sheet 802. While specific dimensions are indicated in the figure it should be recognized that these are exemplary only and given to impart an idea of scale. For example, the dimensions given indicate ferritic block 804 is over ten times thicker than ferritic sheet; however, in some embodiments, ferritic block 804 can be closer to three to five times thicker than the ferritic sheet. In some embodiments, ferritic sheet 802 can be as thin as 80 microns. Ferritic block can be operative to attract magnetic flux to flow into and along ferritic sheet 802. By localizing the ferritic material in ferritic block 804, the thin geometry of the ferritic sheet 802 can fit between other electrical components of electronic device 200. FIG. 8 also depicts an antenna pattern 806 arranged along ferritic sheet 802. Antenna pattern 806 can be configured to give additional functionality to ferritic sheet assembly 800, as depicted and discussed in previous figures.

Figure 9A:
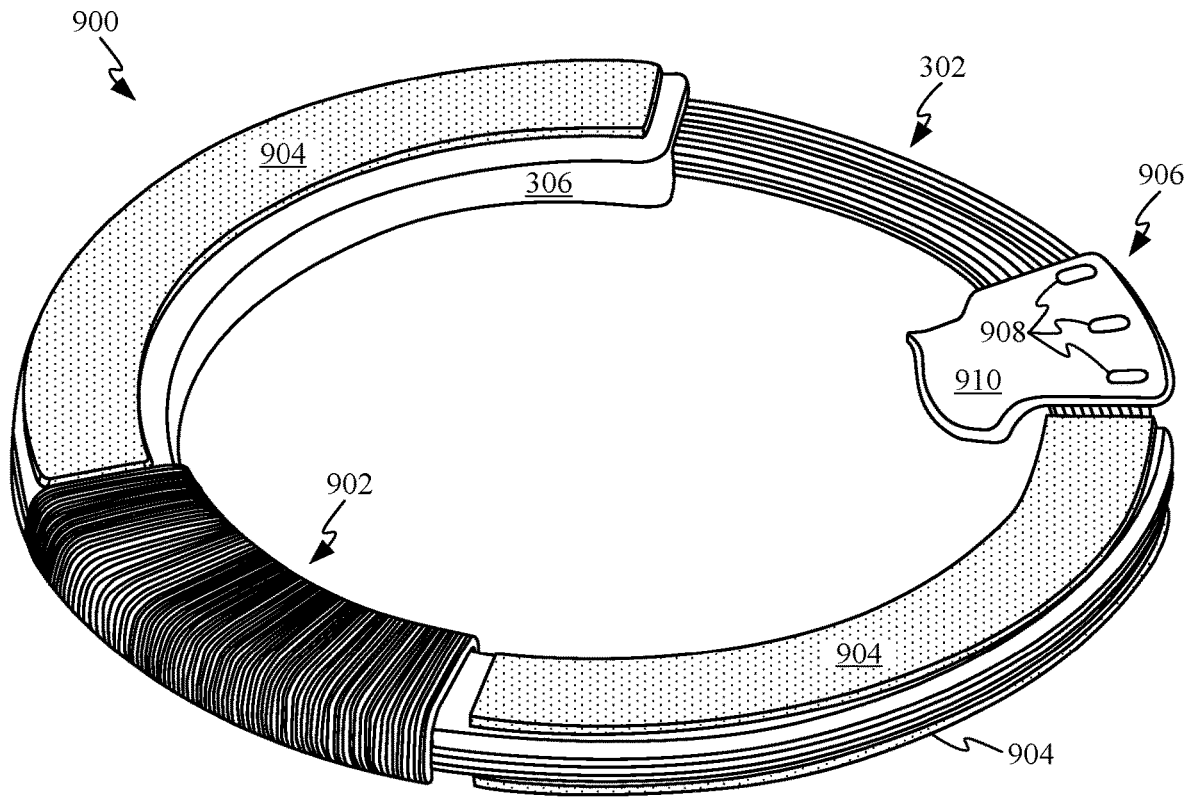
FIGS. 9A-9B show perspective and top views of another alternative charging coil configuration.
Figure 9B:
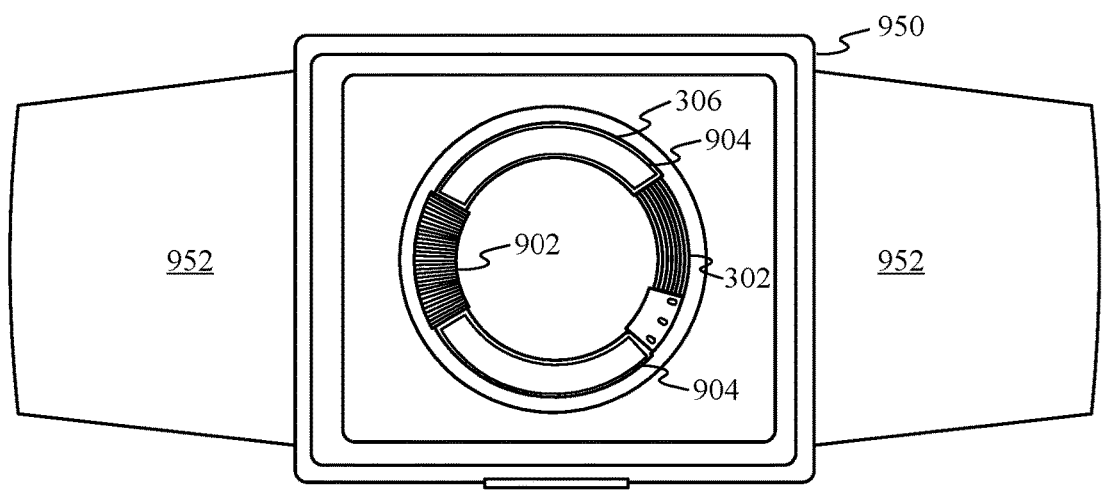

FIGS. 9A-9B show perspective and top views of another alternative charging coil configuration. In particular, FIG. 9A shows a perspective view of charging coil assembly 900. Charging coil assembly 900 includes a primary inductive coil 302 and an AC shield 306. AC shield 306 has a gap that exposes a portion of primary inductive coil 302. Charging coil assembly 900 includes a single secondary inductive coil 902 positioned on substantially the oppose side of charging coil assembly 900 from the gap defined by AC coil 306. The depicted single charging coil configuration advantageously simplifies the charging coil configuration. Charging coil assembly 900 also includes ferritic strips 904 attached to both upper and lower surfaces of AC coil 306 on either side of secondary inductive coil 902. The ferritic strips add ferritic material to AC shield 306 and occupy the area just above and below AC shield 306. Because secondary coil assembly 902 already increases the thickness of charging coil assembly 900, ferritic strips 904 help to make the overall thickness of charging coil assembly 900 more consistent. The additional ferritic material provided by ferritic strips 904 functions to increase the amount of magnetic flux drawn into secondary coil 904 when a device associated with charging coil assembly 900 is positioned in an orthogonal charging configuration. In some embodiments, a thickness of AC shield 306 can be varied so that portions of AC shield 306 engaged by secondary inductive coil 902 are thinner than portions of AC shield 306 positioned on either side of secondary inductive coil 902. A variable thickness AC shield 306 can be used instead of adding ferritic strips 904 to AC shield 306.

FIG. 9A also shows how charging coil assembly 900 includes consolidated termination pad assembly 906. Consolidated termination pad assembly 906 is positioned within the gap defined by AC shield 306 and consequently, its inclusion does not significantly increase the thickness of charging coil assembly 900. Consolidation termination pad assembly 906 includes three termination pads 908 embedded within a flexible PCB substrate 910. In some embodiments, termination pads 908 can be electrically coupled to another electrical assembly positioned above charging coil assembly 900. In some embodiments, consolidated termination pad assembly 906 can include a larger or smaller number of termination pads 908. While consolidation termination pad assembly 906 is shown ending abruptly, the abrupt ending is used only to simplify the illustration. It should be appreciated that flexible PCB substrate 910 can extend and be electrically coupled to other electrical components associated with charging coil assembly 900.

FIG. 9B shows charging coil assembly 900 positioned within a device housing 950 that includes wristband 952. Device housing 950 is depicted resting on its side in an orthogonal orientation so that secondary inductive coil 902 is positioned to receive electrical energy from an external charging coil. It should be noted that by positioning secondary inductive coil 902 in this way, charging coil assembly 900 is also able to charge orthogonally if flipped over onto its other side. It should also be appreciated that while the gap in AC shield 306 is shown positioned opposite secondary charging coil 902, the gap defined by AC shield 306 can be positioned anywhere along AC shield 306 with the exception of the area surrounded by secondary charging coil 902.

Figure 10A:
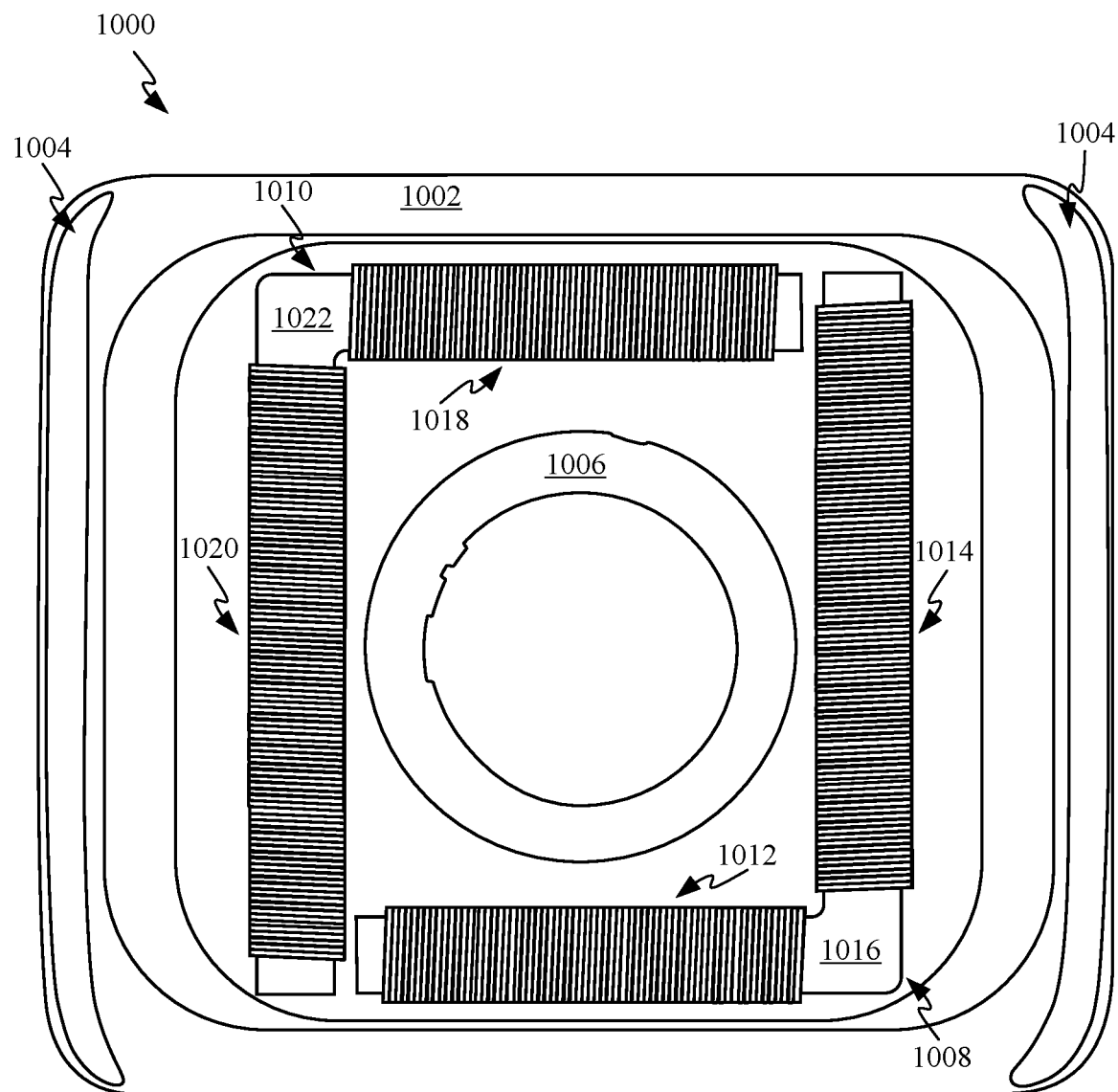
FIG. 10A shows a bottom view of another embodiment of a wearable device having wireless coils for receiving electrical energy from one or more coils of a charging pad in a loose coupling configuration.

FIG. 10A shows a bottom view of another embodiment of a wearable device having wireless coils for receiving electrical energy from one or more coils of a charging pad in a loose coupling configuration. In particular, wearable device 1000 includes a housing 1002 that includes recesses 1004 for receiving a wristband for attaching hosing 1002 to the wrist of a user. Housing 1002 encloses primary charging coil 1006 positioned in a central region of housing 1002. Primary charging coil 1006 can be arranged similarly to the primary coils described above and is generally configured to work with a magnetically aligned charging device that is designed to operate in precise alignment with the charging device (see FIG. 2A). Secondary charging coil assemblies 1008 and 1010 can be arranged around a periphery of the primary charging coil. Each of the secondary charging coil assemblies can include multiple secondary coils wrapped around a ferritic core. For example, charging coil assembly 1008 includes secondary coils 1012 and 1014 wrapped around ferritic core 1016. Similarly, secondary coil assembly 1010 includes secondary coils 1018 and 1020 wrapped around ferritic core 1022. Ferritic cores 1016 and 1022 can include two legs extending away from a junction region. As depicted in FIG. 10A, the legs are arranged in an L-shaped geometry that orients secondary coils 1012 and 1014 orthogonally with respect to one another. In some embodiments, the legs of the ferritic cores can be slightly curved to accommodate other internal components or a shape of the housing. The ferritic cores 1016 and 1022 also help channel and draw magnetic flux oriented in different directions into one of the secondary charging coils, thereby increasing efficiency over a single coil receiver. While ferritic cores 1016 and 1022 orient associated secondary coils orthogonally, it should be noted that this geometry can correspond to the rectangular shape of housing 1002 and that other shapes are certainly possible. For example, a hexagonal or circular case could include ferritic cores with an angle greater than 90 degrees to conform with a shape of the housing.

Figure 10B:
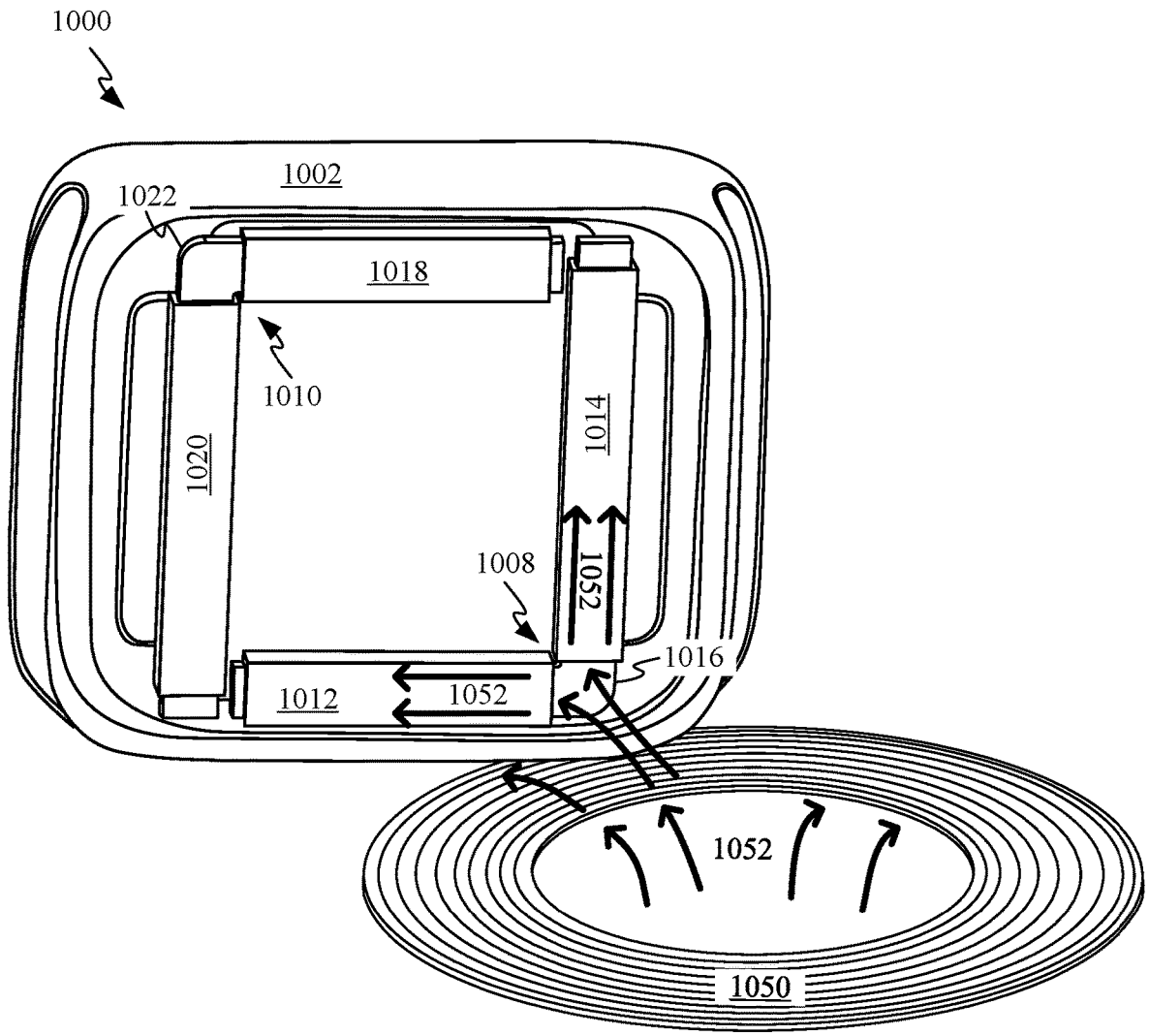
FIG. 10B shows a perspective view of the wearable device depicted in FIG. 10A adjacent to a charging coil.
Figure 10C:
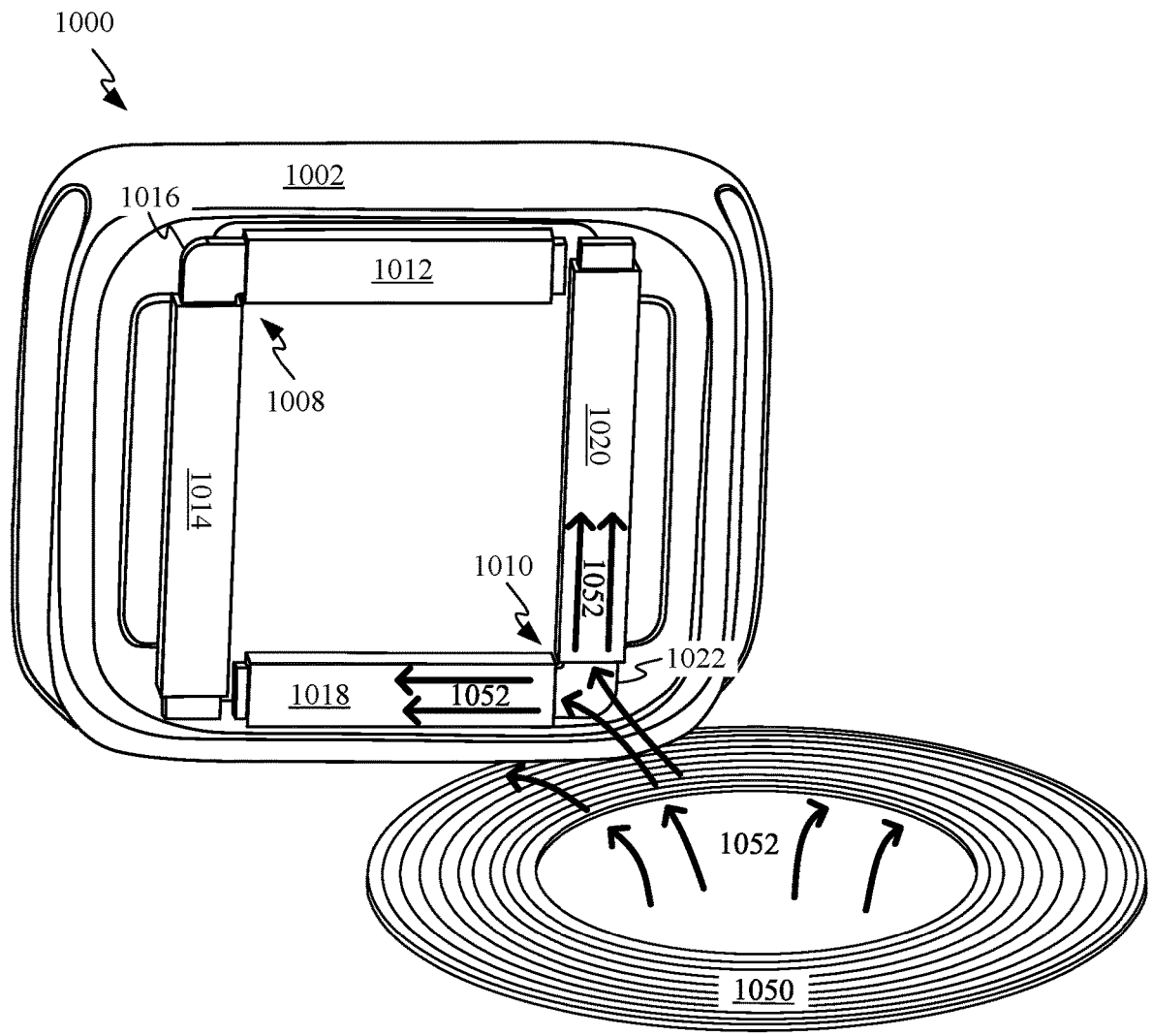
FIG. 10C shows a perspective view of the wearable device depicted in FIGS. 10A-10B adjacent to the charging coil in another orientation.

FIG. 10B shows a perspective view of wearable device 1000 adjacent to a charging coil 1050. Because coils in a device are rarely precisely aligned when a charging coil is used with a charging pad, ferritic cores can be helpful in guiding magnetic flux through the secondary charging coils. As depicted, ferritic core 1016 helps guide magnetic flux 1052 emitted from charging coil through one of secondary coils 1012 and/or 1014. In this way, magnetic flux that would otherwise be oriented at too great an angle with respect to secondary coil 1014 to be channeled through that coil can be channeled through secondary coil 1012. In the case where wearable device 1000 is resting with secondary coil 1018 closest to charging coil 1050, ferritic core 1022 can be configured to guide magnetic flux into secondary coils 1018 and 1020. While magnetic flux is also drawn into ferritic core 1022, the device could include a processor configured to select only the secondary coil assembly with the highest charging efficiency for charging. This can help to conserve energy in embodiments where the secondary coil assemblies are drawing electrical energy from two different coils in an associated charging mat. FIG. 10C shows that when wearable device 1000 rests on its opposite side, secondary charging coil assembly 1010 is configured to receive energy rather than secondary charging coil assembly 1008.

Figure 11:
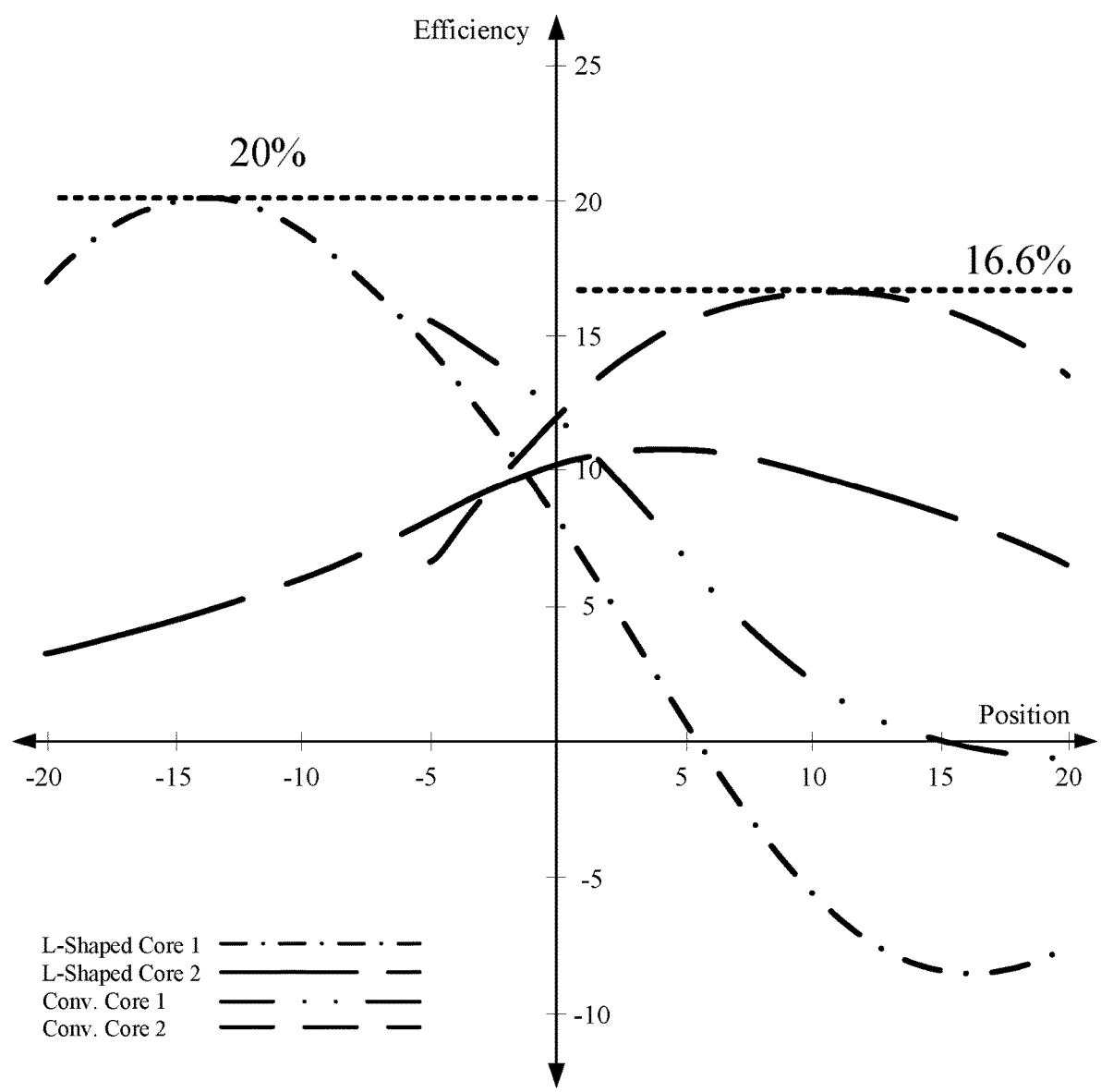
FIG. 11 shows a graph illustrating variation in charging efficiency as a function of position of two different configurations of a wearable device on a charging mat.

FIG. 11 shows a graph illustrating variations in charging efficiency as a function of position of a wearable device on a charging mat. The graph illustrates the performance of two different charging systems. L-shaped core 1 and L-shaped core 2 are associated with a system similar to the one shown in FIGS. 10A-10B while Conventional Core 1 and Conventional Core 2 are associated with a different charging system having ferritic cores with only a single inductive coil each, where both the coils associated with both cores are oriented in the same direction. As depicted, the conventional cores have a charging efficiency that varies inversely depending on device position relative to various charging coils and maxes out at an efficiency of almost 17%. By adding a second coil in a different orientation, the L-shaped cores are able to achieve a peak efficiency of 20%. The curve representing L-shaped core 1 corresponds to ferritic core 1016 as depicted in FIG. 10A, while the curve representing L-shaped core 2 corresponds to ferritic core 1022. The lower maximum efficiency of L-shaped core 2 is a result of that core being farther from the surface of the charging mat. Consequently, flipping the device over would result in the curves being reversed.

Figure 12:
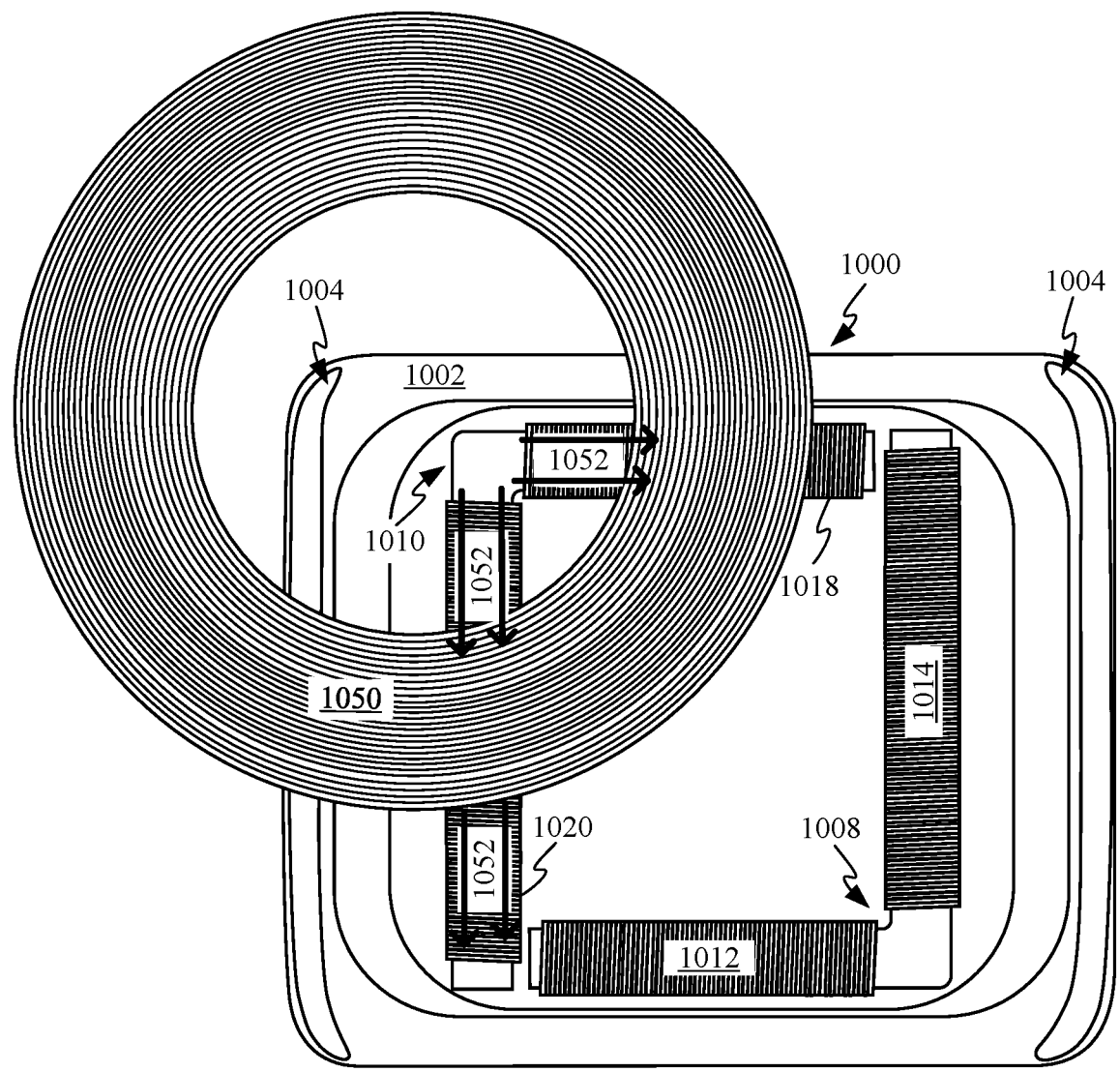
FIG. 12 shows bottom view of the wearable device depicted in FIGS. 10A-10B and how secondary coil assemblies can be utilized in another orientation.

FIG. 12 shows a bottom view of wearable device 1000 and how secondary coil assemblies 1008 and 1010 can also be utilized in a second orientation. When wearable device 1000 is positioned so that the outer surface of wearable device 1000, against which the coils are arranged, is in direct contact with the charging mat and proximate charging coil 1050, as depicted in FIG. 12. In this configuration, the secondary coil assemblies can still be utilized to achieve a loose magnetic coupling with charging coil 1050. The loose coupling achieves a higher efficiency than with the configuration shown in FIGS. 10A-10B since this positions both secondary coils 1018 and 1020 in close proximity to charging coil 1050.

Figure 13:
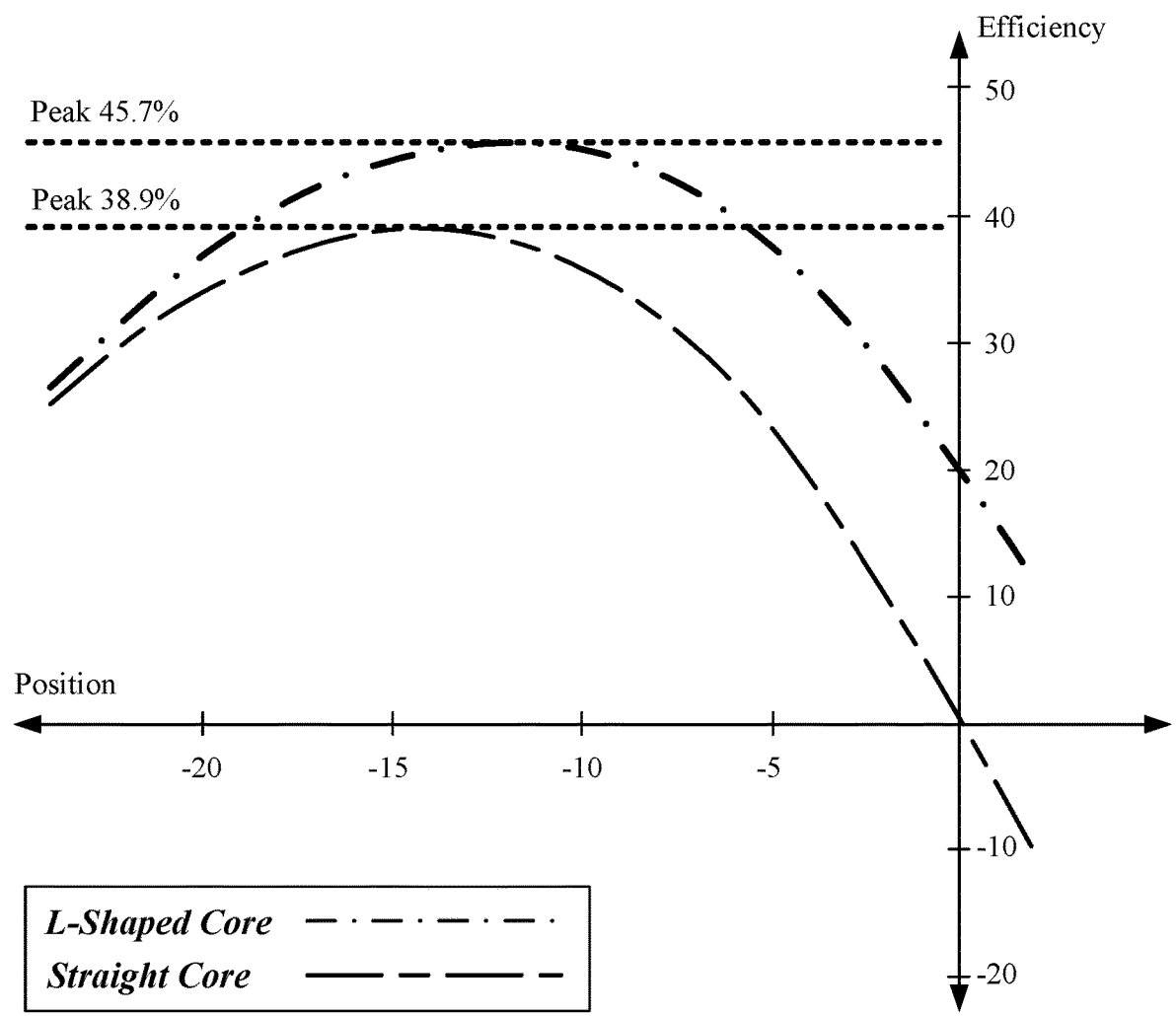
FIG. 13 shows a graph illustrating variation in charging efficiency as a function of position of two different configurations of a wearable device on a charging mat.

FIG. 13 shows how the configuration depicted in FIG. 12 can result in a charging efficiency of up to about 46%, whereas a more conventional single coil in a similar configuration would max out at about 39% charging efficiency. The charging efficiency in this orientation tends to be higher on account of the inductive coils being much closer to the charging mat in the orientation shown in FIG. 12 than in the previously depicted configuration depicted in FIGS. 10B-10C, thereby increasing the maximum achievable efficiency for the device.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A wearable device, comprising:
   a device housing;
   an antenna disposed within the device housing, the antenna comprising a planar substrate having opposing planar surfaces and one or more electrically conductive traces disposed to form a planar coil on at least one of the opposing planar surfaces and configured to receive and transmit data from the wearable device; and an inductive charging coil including multiple linear lengths of conductive material wrapped around the planar substrate of the antenna such that the inductive charging coil extends across both opposing planar surfaces of the planar substrate of the antenna and at least some of the linear lengths of the conductive material of the inductive charging coil cross at least a portion of the planar coil of the antenna, the inductive charging coil being configured to receive electrical energy for powering the wearable device, wherein the antenna and the inductive charging coil are electrically separate components.

2. The wearable device as recited in claim 1, wherein the inductive charging coil comprises a flexible printed circuit board.

3. The wearable device as recited in claim 2, wherein the inductive charging coil further comprises a plurality of parallel electrically conductive traces extending from a first side of the flexible printed circuit board to a second side of the flexible printed circuit board opposite the first side.

4. The wearable device as recited in claim 1, wherein the planar substrate comprises a ferritic sheet.

5. The wearable device as recited in claim 4, further comprising a ferritic block secured to one end of the ferritic sheet, the ferritic block being substantially thicker than the ferritic sheet.

6. The wearable device as recited in claim 4, wherein the one or more electrically conductive traces of the antenna are electroplated onto the ferritic sheet.

7. The wearable device as recited in claim 6, further comprising an insulating layer, the one or more electrically conductive traces of the antenna being disposed between the ferritic sheet and the insulating layer.

8. The wearable device as recited in claim 1, wherein the inductive charging coil is a first inductive charging coil and wherein the wearable device further comprises a second inductive charging coil oriented orthogonally with respect to the first inductive charging coil.

9. The wearable device as recited in claim 8, further comprising an electronic display arranged within an opening defined by a first wall of the device housing the first wall being positioned opposite a second wall of the device housing , wherein the first inductive charging coil is closer to the first wall than the second wall.

10. The wearable device as recited in claim 8, further comprising a third inductive charging coil wrapped around the second inductive charging coil.

11. A wearable device, comprising:
an antenna comprising a planar substrate having opposing planar surfaces and one or more electrically conductive traces disposed to form a planar coil on at least one of the opposing planar surfaces, the antenna being configured to perform at least one of receiving and transmitting data from the wearable device;
a flexible substrate wrapped around a portion of the planar substrate of the antenna, opposing ends of the flexible substrate being joined together;
electrically conductive traces arranged along a surface of the flexible substrate such that the electrically conductive traces overlap both opposing planar surfaces of the planar substrate of the antenna and cross over the planar coil of the antenna, the electrically conductive traces being coupled together in a region where the opposing ends of the flexible substrate are joined together, wherein the electrically conductive traces are electrically separate from the antenna; and
a device housing enclosing the antenna and the flexible substrate.

12. The wearable device as recited in claim 11, further comprising a display, wherein the antenna is configured to transmit and receive data through the display.

13. The wearable device as recited in claim 11, wherein the planar substrate comprises a ferritic substrate, the one or more electrically conductive traces of the antenna being arranged along a surface of the ferritic substrate.

14. The wearable device as recited in claim 13, wherein the ferritic substrate is configured to draw magnetic flux through a central opening defined by the electrically conductive traces.

15. The wearable device as recited in claim 11, further comprising a battery, wherein the electrically conductive traces arranged along the surface of the flexible substrate are coupled to the battery.

16. The wearable device of claim 11, further comprising a wristband coupled to opposing sides of the device housing.

17. The wearable device as recited in claim 11, wherein the flexible substrate and electrically conductive traces cooperate to form an inductive charging coil.

18. A wearable device, comprising:
a device housing;
an antenna disposed within the device housing, the antenna comprising a planar substrate having opposing planar surfaces and one or more electrically conductive traces disposed to form a planar coil on at least one of the opposing planar surfaces, the antenna being configured to receive and transmit data from the wearable device;
a flexible substrate wrapped around a portion of the antenna, opposing ends of the flexible substrate being joined together; and
electrically conductive traces arranged along a surface of the flexible substrate such that the electrically conductive traces overlap both opposing planar surfaces of the planar substrate of the antenna and cross over the planar coil of the antenna, the electrically conductive traces extending across the opposing ends of the flexible substrate multiple times to form a coil structure configured to receive electrical energy from a magnetic field, wherein the electrically conductive traces are electrically separate from the antenna.

19. The wearable device as recited in claim 18, wherein the electrically conductive traces are arranged along the flexible substrate in a series of parallel, electrically conductive traces.

20. The wearable device as recited in claim 18, wherein the antenna further comprises a ferritic block at one end of the antenna configured to draw a magnetic field through a central opening defined by the flexible substrate.

* * * * *